(12) United States Patent
Akutsu et al.

(10) Patent No.: US 6,537,435 B2
(45) Date of Patent: Mar. 25, 2003

(54) IMAGE FORMING METHOD

(75) Inventors: Eiichi Akutsu, Ashigarakami-gun (JP); Shigemi Ohtsu, Ashigarakami-gun (JP); Lyong Sun Pu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 7 days.

(21) Appl. No.: 09/758,145

(22) Filed: Jan. 12, 2001

(65) Prior Publication Data

US 2003/0034249 A1 Feb. 20, 2003

Related U.S. Application Data

(63) Continuation of application No. 09/161,527, filed on Sep. 28, 1998.

(30) Foreign Application Priority Data

Oct. 1, 1997 (JP) .............................. 9-268642
Dec. 26, 1997 (JP) .............................. 9-359545

(51) Int. Cl.[7] .............................. C08F 2/58; C25D 1/12; C25D 13/00; C25D 15/00
(52) U.S. Cl. .............................. 204/471; 204/483; 204/484; 204/485; 204/499; 204/478
(58) Field of Search .............................. 204/471, 478, 204/483, 484, 485, 499

(56) References Cited

U.S. PATENT DOCUMENTS

| | | |
|---|---|---|
| 4,115,227 A | 9/1978 | Hazan |
| 4,840,709 A * | 6/1989 | Pliefke .............................. 205/108 |

(List continued on next page.)

FOREIGN PATENT DOCUMENTS

| | | |
|---|---|---|
| JP | A-60-23051 | 2/1985 |
| JP | A-60-184697 | 9/1985 |
| JP | A-63-237085 | 10/1988 |

(List continued on next page.)

OTHER PUBLICATIONS

H. Tanemura, et al., "High Quality Color Copy System Using Photographic Process", 1989, pp. 229–232. No Month Avail.

(List continued on next page.)

*Primary Examiner*—Nam Nguyen
*Assistant Examiner*—Wesley A. Nicolas
(74) *Attorney, Agent, or Firm*—Oliff & Berridge, PLC

(57) ABSTRACT

An image forming method wherein an aqueous dispersion is prepared in a vessel of an apparatus. The aqueous dispersion contains an electrodeposition material including a fine particle coloring material, and a polymer which is chemically dissolved, or is deposited and precipitated, by a change in pH. The vessel can hold a liquid, and has therein an image supporting member. The image supporting member has at least an electrode, which can supply current or an electric field in accordance with an image pattern, and a surface which can support an image; and a counter electrode which forms a pair of electrodes together with the electrode. The electrodeposition material is deposited and precipitated to form an image by supplying current or an electric field in accordance with an image pattern to the image supporting member and the counter electrode and by changing the pH value of the aqueous dispersion in the vicinity of the image supporting surface of the image supporting member. The polymer in the electrodeposition material has both hydrophobic groups and hydrophilic groups in the molecule, the proportion of the number of the hydrophobic groups to the total number of hydrophilic groups and the hydrophobic groups in the polymer is in the range of from 40 to 80%, 50% or more of the hydrophilic groups can reversibly change from hydrophilic groups to hydrophobic groups due to a change in pH value, and the acid value of the polymer is on the range of from 30 to 400.

24 Claims, 9 Drawing Sheets

U.S. PATENT DOCUMENTS

| | | |
|---|---|---|
| 5,203,974 A | 4/1993 | Kokado et al. |
| 5,492,614 A | 2/1996 | Zawacky et al. |
| 6,033,549 A | 3/2000 | Peinecke et al. |

FOREIGN PATENT DOCUMENTS

| | | |
|---|---|---|
| JP | A-2-267298 | 11/1990 |
| JP | A-3-87702 | 4/1991 |
| JP | A-3-152807 | 6/1991 |
| JP | A-3-243788 | 10/1991 |
| JP | A-4-9902 | 1/1992 |
| JP | A-4-270316 | 9/1992 |
| JP | A-4-295802 | 10/1992 |
| JP | A-4-365896 | 12/1992 |
| JP | A-5-5874 | 1/1993 |
| JP | A-5-142418 | 6/1993 |
| JP | A-5-150112 | 6/1993 |
| JP | A-6-41221 | 6/1994 |
| JP | A-6-293125 | 10/1994 |
| JP | B2-7-54407 | 6/1995 |
| JP | A-7-181750 | 7/1995 |
| JP | A-7-261018 | 10/1995 |
| JP | A-7-318721 | 12/1995 |
| JP | A-7-325211 | 12/1995 |
| JP | A-8-6011 | 1/1996 |
| JP | A-8-75918 | 3/1996 |
| JP | A-8-110520 | 4/1996 |
| JP | A-8-152617 | 6/1996 |
| JP | A-8-188730 | 7/1996 |
| JP | A-9-152593 | 6/1997 |
| JP | A-9-279355 | 10/1997 |
| JP | A-10-260401 | 9/1998 |

OTHER PUBLICATIONS

E.G. Caruthers, et al. "Modeling of Liquid Toner Electrical Characteristics", *IS&T's Tenth International Congress on Advances in Non–Impact Printing Technologies (1994)*, pp. 204–209. No Month Avail.

M. Usui, "Development of the new MACH (MLChips type)", 1996, pp. 161–164. No Month Avail.

* cited by examiner

F I G. 4
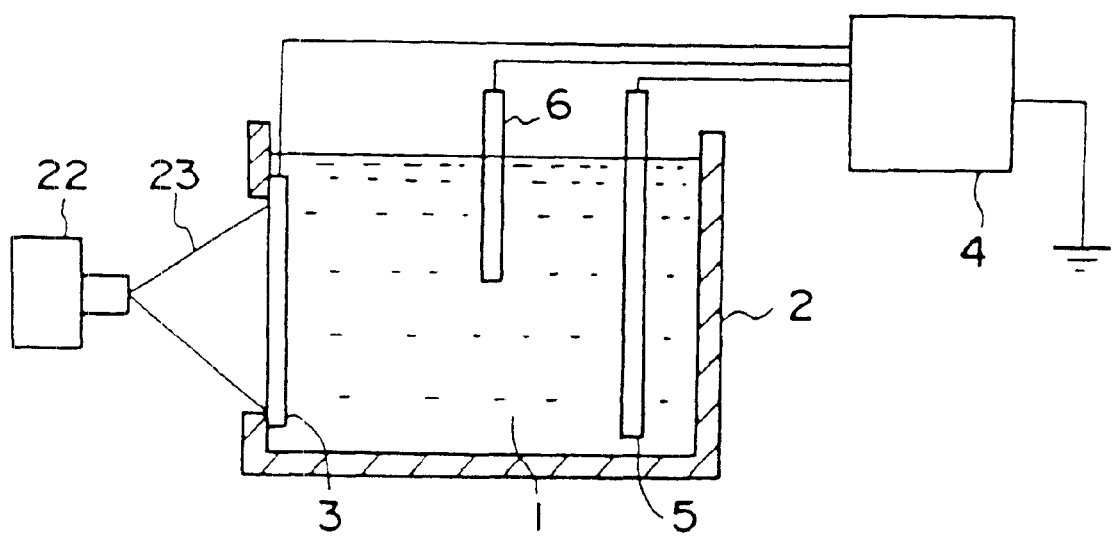

IMAGE FORMING METHOD

This is a Continuation of application Ser. No. 09/161,527, filed Sep. 28, 1998.

BACKGROUND OF THE INVENTION

1. Field of the Invention

The present invention relates to an image forming method wherein an image is formed by electrochemically insolubilizing an image forming material by application of electric current using an aqueous coloring material dispersion, particularly an aqueous fine particle coloring material dispersion, and an image forming material used in this method.

2. Description of the Related Art

Many methods of using a liquid image forming material are known in image recording technologies used in offices. For example, silver salt recording technology, ink jet recording technology, and electrophotographic recording technology.

Printing technology using silver salt has been published in Tanemura Hatsumi et al., "HIGH QUALITY COLOR COPYING SYSTEM BY SILVER SALT PHOTOGRAPHIC METHOD", Preprint of Japan Hardcopy '89, p229. Printing technology are known using liquid development electrophotographic technology has been published in E. B. Caruthers et al., "Modeling of Liquid Toner Electrical Characteristics", Proceedings of IS & T 10th Int'l. Congress on Advances in Non-Impact Printing Technologies, p204 ('94). Printing technology using ink jet recording has been published in many technical reports such as Usui Minoru, "Development of a New Process MACH", Preprint of Japan Hardcopy '96, p161.

In other conventional printing technologies, the recording method using silver salt does not present problems of image quality or image fastness. However, the use of this method in an office is associated with problems, because this method is based on a printing process which involves a chemical reaction using chemically active agents and producing waste. The problems of ink jet printing technology are that high resolution cannot be easily obtained because of problems created by the small nozzle diameter in printing reliability; and that image fastness, safety, and printability on plain paper are inadequate, because the image forming material is usually an aqueous dye. Electrophotographic technology has no problem with regard to image quality, printability on plain paper, and high image fastness comparable to that of a printed product. However, electrophotographic technology has the disadvantages that a large amount of energy is consumed in the fixing unit of an electrophotographic apparatus; that the size of the apparatus is large because of the complicated printing process; and that safety and reliability problems arise.

There are also disclosed as conventional technologies resembling the image forming method of the present invention, for example, a technology using an electrodepositable liquid in which a coloring material is dispersed in an electrically insulating liquid so as to generate an electrical double layer in Japanese Patent Application Laid-Open (JP-A) No. 7-181750 and Japanese Patent Application Publication (JP-B) No. 7-54407; "Fine Pattern Forming Method" relating to an electrodeposition printing technology using a printing plate comprising an electrically conductive substrate with an insulating pattern formed thereon in JP-A No. 4-9902; and "Electrodeposition Offset Printing Method and Printing Plate" in JP-A No. 6-293125, respectively.

Meanwhile, properties required for printing technology for use in offices are, for example, a color high-quality image of 600 DPI or higher and multi-gradation, capability of printing on plain paper, high image fastness comparable to that of a printed product, high safety of the recorded matter and the recording apparatus, almost no waste produced, and low running cost. However, conventional technologies have various defects as described above, and none of the technologies described in the above-described various patents documents using electrodeposition property have reached the level at which the above-mentioned requirements are completely satisfied.

In order to obtain an image having a high quality (resolution of a level of 1000 DPI, good color reproduction, and multi-gradation), the thickness of the image structure is preferably 2 microns or less, and more preferably 1 micron or less, in the light of the relationship between the range of color reproduction and the sharpness of image. Accordingly, the average particle size of the image forming material, as the element which imparts structure to the image, needs to be of a sub-micron order. However, since a fluidity problem arises if the average particle size of the image forming material is 5 $\mu$m or less, practical use of a powdery image forming material is difficult. In comparison, when viewed from this standpoint, the use of a liquid image forming material would be effective. In the step of forming an image having a size of the order of several microns, it is technically difficult to accurately control the image formation of the particles of image forming material if the size of the particles is very small. Accordingly, use of aqueous solution of a dye having a size of molecular order which is a minimum fine particle as an electrodeposition material is considered to be a very effective technical method also from the viewpoint of an accurate coloring material controlling method.

The electrophotographic technology, which uses a developer in the form of an electrically insulating liquid and which is disclosed in, for example, JP-A No. 7-181750, is advantageous in that high resolution can be obtained because the size of the image forming material is of a sub-micron order; and printability on plain paper is high. However, since this method uses a developer comprising a hydrocarbon solvent, the solvent vapor presents a serious safety problem. Therefore, the use of such a developer is strictly regulated in some countries.

The electrodeposition printing technology using a printing plate comprising an electrically conductive substrate and an electrically insulating pattern formed thereon as described in patents such as JP-A No. 4-9902 and the like is disadvantageous in that it is difficult to change image patterns for each printing because the process is complicated, for example, the non-image portion of an insulating resist needs to be prepared beforehand by photolithography. Other disadvantages are as follows. Since the apparatus to be used in this method is provided with a high precision, has a large size, involves many steps and produces a large amount of waste, it necessarily follows that the place where the apparatus is installed for printing is limited to a factory well equipped with facilities. Further, since the hysteresis of the image forming step tends to remain on the substrate, minute image recording cannot be fully reproduced. Furthermore, since the image forming portions in this method are concave, it is difficult to obtain a high quality image, because the selective adherence of particles to the image portions by electrophoresis is weakened and a large proportion of the liquid component of the image forming liquid material tends to remain on the image forming portions thus reducing the viscosity of the image forming material in the image forming portions, and consequently the image forming material in the image forming portions is liable to flow or cause a cohesive failure in the transfer step. Further, any of them is a technology for making a printing plate used for forming fine patterns, and is not a technology of recording an image directly on a recording medium.

As described above, technologies of conventional image forming methods cannot satisfy the properties, i.e., a high degree of safety using a simple apparatus, required for printing for use in offices.

In order to realize a high quality (600 DPI or more and multi-gradation), the minimum unit size of image forming material is preferably 1 micron or less. Therefore, it is necessary to use a liquid image forming material which can contain fine particles of a coloring material. When the installation of an apparatus in an office is taken into consideration, the liquid for use in the, image forming material needs to be extremely safe. Preferably, water should be selected as the liquid as there are no problems regarding its safety. A printing process using a printing plate which cannot be regenerated is not suitable for use in an office, because office printing technology is required to prepare various sorts of printed matters in small quantities, easily, and at a low cost. Therefore, the market has a liking for a system which comprises inputting an image signal to produce image information for every printing and the image information as an image of the image forming material is transferred for recording on various recording media such as plain paper and the like corresponding to various need of uses.

In addition, when such factors as the fastness and high optical density of an image, and the safety from the fact that the color forming material is not taken into human body are taken into consideration, it is necessary to use a coloring material comprising a pigment. It is also necessary to keep the energy consumption to a minimum in the printing step.

Further, a pH regulator is often added to an aqueous dispersion for reducing energy required for deposition of an electrodeposition material. It has been known that if this pH regulator remains in the deposited electrodeposition film, various problems occur such as re-dissolution of an image (electrodeposition film) and the like from the viewpoint of image stability.

The present invention has been made to address the aforementioned properties. Therefore it is an object of the present invention to obtain a high-quality image by use of an electrodeposition material containing a pigment coloring material, particularly fine particles of a coloring material and to provide an image forming method which is able to form an image even by application of voltage wherein potential difference between image formation part and a reference electrode generated corresponding to photoimage signals, is extremely safe and simple and has a wide area of use as well as to provide an image forming material which is suited for the method.

SUMMARY OF THE INVENTION

The main constitution of the image forming method of the invention comprises an aqueous dispersion containing a coloring material composed of a pigment and a specific electrodeposition material and a vessel thereof, an image supporting member having an electrode which can generate an electric image pattern and a counter electrode, and further, a jig, as an auxiliary member, for immersing the image supporting member and the like into a vessel into which the aqueous electrodeposition material dispersion is stored, and fixing them to given positions, and a control device for the above-described members. Regarding an image pattern formed on the image supporting member by depositing and precipitating an electrodeposition material by this apparatus, the image supporting member can be directly used as a document, and also, the image can be transferred and fixed onto other media and used as a document.

Namely, the image forming method according to the first aspect of the present invention is an image forming method wherein an aqueous dispersion containing an electrodeposition material including:
  a fine particle coloring material; and
  a polymer which is chemically dissolved, or deposited and
  precipitated by change in pH,
is prepared in a liquid in vessel and the vessel having therein:
  an image supporting member having at least:
    an electrode, which can supply current or an electric field in accordance with an image pattern,
    and a surface which can support an image; and
    a counter electrode which forms a pair of electrodes together with the electrode,
    and the electrodeposition material is deposited and precipitated to form an image by supporting current or an electric field in accordance with an image pattern to the image supporting member and the counter electrode and by changing the pH value of the aqueous dispersion in the vicinity of the image supporting surface of the image supporting member,
  wherein the polymer comprised in the electrodeposition material has both hydrophobic groups and hydrophilic groups in the molecule, the proportion of the number of the hydrophobic groups to the total number of hydrophobic groups and hydrophilic groups in the polymer is in the range of from 40% to 80%, 50% or more of the hydrophilic groups can reversibly change from hydrophilic groups to hydrophobic groups due to a change in pH value, and the acid value of the polymer is in the range of from 30 to 400.

The image forming method according to the second aspect of the present invention is an image forming method wherein an aqueous dispersion containing an electrodeposition material including:
  a coloring material; and
  a polymer which is chemically dissolved, or deposited and precipitated, by a change in pH
is prepared in a liquid in vessel and the vessel having therein:
  an image supporting member having at least:
    an electrode, which can supply current or an electric field in accordance with an image pattern,
    and a surface which can support an image; and
    a counter electrode which forms a pair of electrodes together with the electrode,
    and the electrodeposition material is deposited and precipitated to form an image by supplying current or an electric field in accordance with an image pattern to the image supporting member and the counter electrode and by changing the pH value of the aqueous dispersion in the vicinity of the image supporting surface of the image supporting member,
  wherein the aqueous dispersion contains at least one pH regulator having a boiling point of 150° C. or less.

Herein, the means for supplying current or electric field to the above-described image supporting member and the counter electrode preferably has mechanism by which a photoimage signal is converted to current in accordance with an inputted photoimage signal, and generates current on the surface of the image supporting member corresponding to the photoimage signal.

In the polymer compound constituting the electrodeposition material, it is preferable that the above-described hydrophilic group part which can reversibly change from hydrophilic groups to hydrophobic groups by change in pH has a carboxyl group or an amino group, and styrene or α-methylstyrene unit is contained in the hydrophobic group part, from the viewpoints of sensitivity and image supporting property.

The image forming material of the present invention is an aqueous dispersion containing a fine particle coloring material and an electrodeposition material composed of a polymer which is chemically dissolved or deposited and precipitated by change in pH, used in the above-described image forming method. The electrodeposition material composed of the polymer has hydrophobic groups and hydrophilic groups together in the molecule, the proportion of the number of the hydrophobic groups of the monomer unit constituting the polymer to the total number of the hydrophilic groups and the hydrophobic groups is in the range from 40% to 80%, and 50% or more of the hydrophilic part can change reversibly from hydrophilic groups to hydrophobic groups by change in pH, and the electrodeposition material contains a copolymer having an acid value from 30 to 400.

In this image forming method, it is preferable from the viewpoint of image stability to perform some heating treatment on the formed image, and the heating treatment can be conducted by any method such as direct application to an image-wise electrodeposition film, a process in which deposited and precipitated electrodeposition material is transferred to a recording medium by heat treatment in a transferring process, provision, or a process in which the transferred image is fixed by heating, and the like, after the process in which deposited and precipitated electrodeposition material is transferred to a recording medium.

BRIEF DESCRIPTION OF THE DRAWINGS

FIG. 4 is a schematic view showing an image recording apparatus used for image recording in Examples 1, 4, 6, 7 and 14.

DESCRIPTION OF THE PREFERRED EMBODIMENTS

Figure 1:
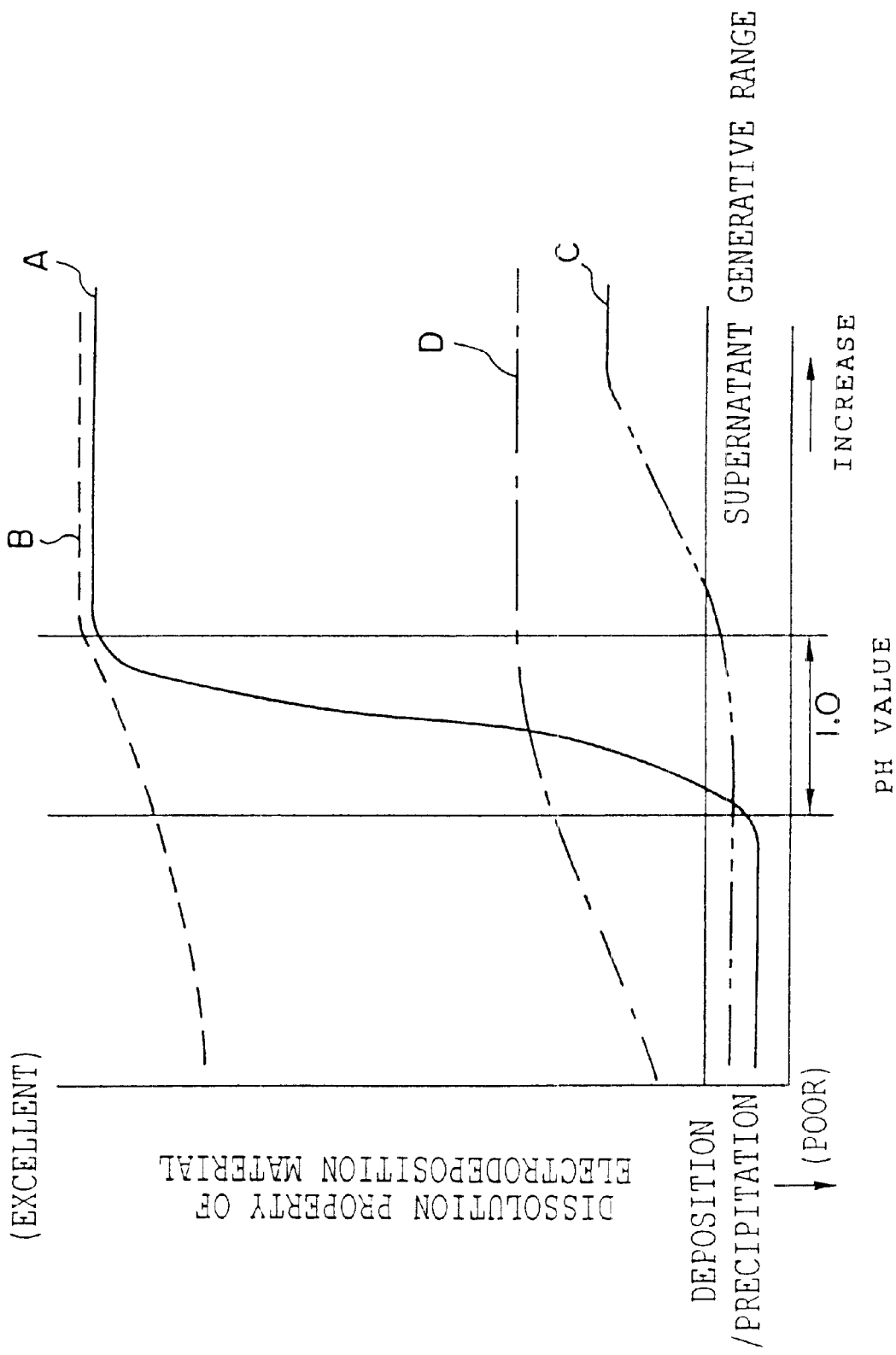
FIG. 1 is a graph showing the relation between change in pH of an aqueous coloring material liquid and the solubility property of the coloring material.

The image forming method of the present invention uses an apparatus in which an aqueous dispersion containing a coloring material, particularly a fine particle coloring material and an electrodeposition material composed of a polymer which is chemically dissolved or deposited and precipitated by change in pH (hereinafter, suitably referred to as an aqueous coloring material electrodeposition liquid or simply an electrodeposition liquid) is filled in a vessel which can contain liquid of an apparatus comprising in the vessel an image supporting member having an electrode which can supply current or electrofield according to image pattern and a plane member which supports an image, together with a counter electrode which is another electrode of the electrode pair.

In the second aspect of the present invention, the aqueous coloring material electrodeposition liquid is allowed to contain a specific pH regulator for improving deposition sensitivity of the electrodeposition film.

The constituent materials of the aqueous coloring material electrodeposition liquid in the second aspect of the present invention are composed mainly of a water-insoluble coloring particle, an aqueous electrodeposition material, water and an aqueous solvent.

The constituent materials of the aqueous coloring material electrodeposition liquid in the first aspect of the present invention are composed mainly of a water-insoluble coloring particle, an aqueous electrodeposition material or colored aqueous electrodeposition material, pH regulator, water and an aqueous solvent.

In any of the first and second aspects of the present invention, other additives such as a wetting material, aqueous polymer material, emulsifying material, latex material, various solvents, surfactant, preservative and anti-mold agent, and the like can be used provided that they do not harm the effect of the present invention.

As for the composition of the aqueous coloring material electrodeposition liquid, the concentration of solids is from 1 to 40% by weight, and preferably from 5 to 19% by weight. If the concentration of solids is less than 1% by weight, it is difficult to obtain dispersion stability of the coloring material component, and it is also difficult to easily obtain a sufficient optical density of images. On the other hand, if the concentration of solids-is more than 40% by weight, the uniformity of the liquid at the time of electrodeposition is liable to deteriorate and handling of liquid conveyance and the like becomes complicated because the liquid exhibits thixotropy.

The content of the coloring components, in the solids of the electrodeposition liquid, is preferably from 20% by weight to 80% by weight, preferably from 30% by weight to 80% by weight, particularly preferably from 40% by weight to 60% by weight. A content in excess of this range may cause excessively high gloss of the image or may reduce the optical density of the image. On the other hand, a content less than this range tends to lead to disadvantages, for example, electrodeposition efficiency decreases; the image layer formation is defective or poor and fixing strength is low; and problems occur in hue.

The resistivity of the electrodeposition liquid is $10^6$ Ω·cm or less, preferably $10^5$ Ω·cm or less, and further preferably, in the range from $10^3$ Ω·cm to 1 Ω·cm. If the resistivity is in excess of this range, the electrodeposition voltage becomes so high that a bubbling phenomenon around the electrode becomes vigorous and the electrodeposition phenomenon becomes unstable and therefore the quality of the resulting films of the formed image tends to vary. On the other hand, when the resistivity is too low, diffusion of electric current of an image signal occurs, and the resolution of an image decreases.

The viscosity of the electrodeposition liquid is preferably in the range from 1 cps to 1000 cps, more preferably from 2 cps to 200 cps. If the viscosity is less than this range, the attendant problem is that the droplets of the liquid are scattered because of the insufficient viscosity of the liquid. On the other hand, if the viscosity is in excess of this range, the problem is that operation load increases and complicated viscosity property are exhibited in conveyance and stirring of an electrodeposition liquid and consequently efficiency decreases.

When setting the initial value of pH of the electrodeposition liquid, the pH is set to a value falling within the range from the pH value at the start of electrodeposition −1 to the pH value at the start of electrodeposition +3, and preferably within the range from the pH value at the start of electrodeposition −0.5 to the pH value at the start of electrodeposition +2.5, when an electrodeposition method in which an electrodeposition material contained in the electrodeposition liquid is deposited on an anode is used. On the other hand, the pH is set to a value falling within the range from the pH value from the start of electrodeposition −3 to the pH value at the start of electrodeposition +1, and preferably within the range from the pH value at the start of electrodeposition −2.5 to the pH value at which pH value at the start of electrodeposition +0.5 when an electrodeposition method in which the electrodeposition material is deposited on a cathode is used. By this setting of the initial value, deposition and precipitation of the electrodeposition material can be conducted sharply and high electrodeposition film formation efficiency is maintained. If the pH is set to a value which is outside this range and which makes the deposition easier relative to the value at which the deposition starts, the dispersibility of the electrodepositable liquid is so unstable that the particles of the coloring material are deposited in non-image areas and the amount deposited varies. Further, if the pH is set to a value which is outside this range and at which the deposition starts, resulting disadvantages are, for example, that the electrodeposition film forming efficiency is low and the electrodeposition field rises; and that the properties of the film formed are not satisfactory.

The electrodeposition material which has an important function in the image forming material of the present invention regarding the properties of the above-described preferable electrodeposition liquid has important roles that the dispersion stability of a coloring material particle in aqueous liquid which is a main component of the electrodeposition liquid is improved, electrodeposition and adsorption phenomena are obtained, namely, rapid deposition and precipitation are attained to form an electrodeposited film (image) by environmental electrochemical change, and water-resistance is imparted to the electrodeposited film (image). Therefore, the electrodeposition material has preferably molecular structure containing both a group (hydrophilic group) which is hydrophilic and easily dissociated into an ion in aqueous liquid and a hydrophobic group which repels water.

The image forming action of the present invention may be explained as follows: the ion dissociation of the hydrophilic group which has been dissociated into an ion in a polymer constituting the electrodeposition material is suppressed by change in pH of the electrodeposition liquid on the surface of the image supporting member due to application of current and is allowed to exhibit hydrophobic function, thereby whole structure of the electrodeposition material itself is hydrophobized, the electrodeposition material containing a coloring material is insolubilized in the aqueous liquid, and the electrodeposition material is deposited and precipitated onto the surface of the image supporting material to form an image. It is assumed that these phenomena occur by molecular chains being spread in the electrodeposition material liquid contract due to change in pH resulting in aggregation of the molecules, and when a coloring material fine particle is used together, deposition phenomenon of an image containing the coloring material fine particle is observed. Thus, the polymer compound used in the electrodeposition material has important roles that the dispersion stability of the coloring particle into the aqueous liquid which is a main component of the electrodeposition liquid is obtained, and the electrodeposition adsorption phenomenon is caused. Therefore, the dispersion material for the electrodeposition has preferably a molecular structure containing both a hydrophilic group and a group which is easily dissociated into an ion in aqueous liquid or a group which has the both functions. Further, it is required that the flocculation of the particle occurs by change in pH and the depositing phenomenon thereof can be observed. The above-described properties are necessary as functions of the electrodeposition liquid.

Dissolution property versus change in pH of the polymer is graphically shown in FIG. 1, as a measure for selecting a polymer compound used in this electrodeposition material. FIG. 1 is a graph showing the relation between the dissolution of the various polymers used in the electrodeposition material and pH values of the solution. In the case of a material having excellent balance between hydrophilic groups and hydrophobic groups in the polymer and having a hydrophilic group which can change to a hydrophibic group depending on conditions, deposition steeply occurs just over a certain pH value as shown in graph A (shown by solid line), and on the other hand, in the case of a material having a high proportion of hydrophilic groups, dissolution property is excellent irrespective of pH value as shown in graph B (shown by broken line). When a high proportion of hydrophobic groups is contained, the material is insoluble irrespective of pH value as shown in graph C (double-dashed broken line). In the case of a material in which the balance between hydrophilic groups and hydrophobic groups is excellent, however, a hydrophilic group which can change to a hydrophobic group is not contained or the proportion thereof is low, change in dissolution/deposition is insufficient for image formation though dissolution property varies as shown in graph D (shown by single-dashed broken line). These properties change also by the relation between a material and a solvent used. In the present invention, the case in which deposition steeply occurs just over a certain pH value is preferable as shown in graph A.

The electrodeposition material contains a thermoplastic resin component, and should exhibit sufficient dissolution property in an aqueous liquid in which the pH value has been regulated. Further, liquid change that a condition wherein the electrodeposition material is dissolved is converted to a condition wherein a precipitation is formed with generating a supernatant occurs within the pH range of 1 in the change in the pH value of the dissolved electrodeposition liquid as shown in graph A. For obtaining more preferred property, it is preferred that the pH range is 0.5 or less. By this range, functions can be imparted that quick deposition of an image is enabled even against steep pH change due to application of current, further, flocculation force of the deposited image can be enhanced, and the re-dissolving speed into the electrodeposition liquid is reduced. As a result, the water-resistance of an image is also obtained. When pH range wherein a precipitation is formed from dissolved condition in the change in the pH value of the electrodeposition liquid is larger than 1, problems in printing properties may remain such as reduction in printing speed for obtaining sufficient image structure and deficiency in the water-resistance of an image, and the like.

For example, when a carboxyl group is used as a hydrophilic group, it is necessary to set pH values on deposition initiation point and dissolution initiation point within acidic range, and in general, it is preferable that the pH values on deposition initiation point and dissolution initiation point are set within the range from 5.0 to 6.9, preferably from 5.5 to 6.5. The pH values of the recording material at least in parts in contact with the surface of the image supporting material may advantageously be set to values within the above-described range. In practice, the deposition initiation point and the dissolution initiation point of the recording material can be recognized by a commercially available pH meter and visual observation using a buffer solution for the recording material.

The above-described actions and properties are required as functions of the electrodeposition material according to the present invention, and for this purpose, it is necessary to obtain structures and properties described below.

Among these electrodeposition materials, as a colorless or pale colored polymer compound, specifically preferable is a polymer compound constituted by a copolymer containing a monomer unit having a hydrophilic group which is dissociated into an ion and a minimum monomer unit having a hydrophobic group which promotes insolubilization against an aqueous electrodeposition liquid wherein the proportion of the number of hydrophobic groups of the minimum monomer unit of the copolymer based on the total number of hydrophilic groups and hydrophobic groups is in the range from 40% to 80%, more preferably from 55% to 70%, since this polymer exhibits high electrodeposition efficiency in particular, electrodeposition property by which a film can be formed at a lower electrodeposition potential, and stable liquid property of the electrodeposition liquid. The numbers of hydrophilic groups and hydrophobic groups can be calculated, for example in the case of a vinyl-based polymer and the like, based on the charge ratio of monomers in conducting polymerization reaction of a polymer.

When the proportion of the number of hydrophobic groups of the monomer unit of the copolymer constituting the electrodeposition material based on the total number of hydrophilic groups and hydrophobic groups is less than 40%, the electrodeposition film formed in electrodeposition is deficient in water-resistance and film strength, and when the proportion of the number of hydrophobic groups based on the total number of hydrophilic groups and hydrophobic groups is not less than 80%, there are problems that dissolution property into an aqueous liquid is insufficient, the electrodeposition liquid becomes turbid, a precipitate of the electrodeposition material is formed, the viscosity of the electrodeposition liquid increases, and the like. Therefore, neither case is preferable.

Figure 2:
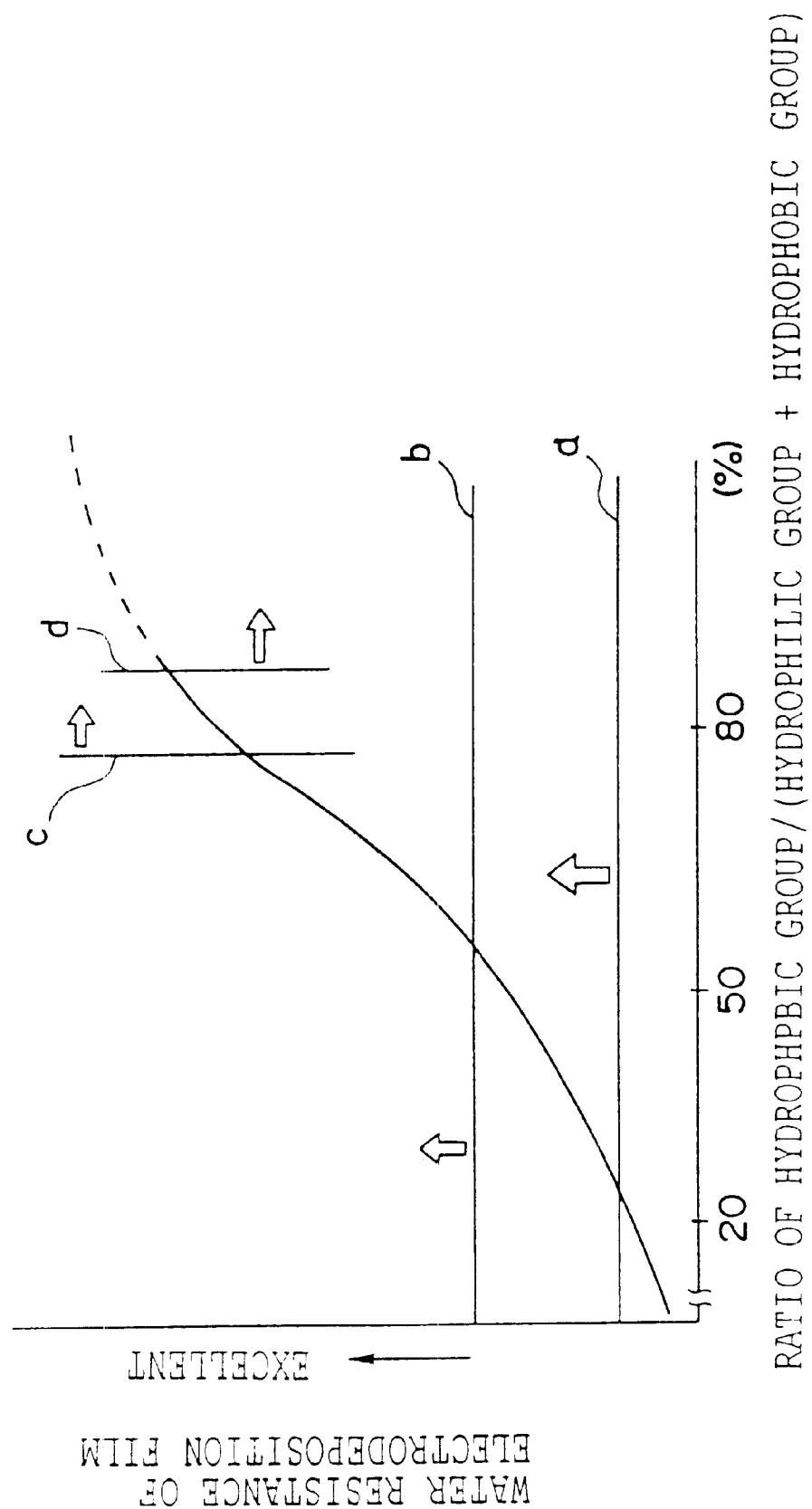
FIG. 2 is a graph showing the relation between the molar ratio of hydrophibic groups to (hydrophobic groups+ hydrophilic groups) and the water-resistance property of a film of an electrodeposition material.

The relation between the water-resistance of an electrodeposition film on which an image is formed by deposition and precipitation and the ratio of the number of hydrophobic groups to the total number of hydrophilic groups and hydrophobic groups is shown in the graph of FIG. 2. Line a parallel to the abscissa of this graph indicates a water-resistant range necessary for retaining an image, and line b indicates an excellent water-resistant range. When the number of hydrophobic groups exceeds line c parallel to the ordinate, the polymer material enters the range wherein the properties and conditions of the solution are unstable due to reduction in the dissolution property of the polymer material, and when the number of hydrophobic groups exceeds line d, the polymer material enters the range wherein solubility is poor and measurement is impossible.

As the monomer unit containing a hydrophilic group used in this electrodeposition material, methacrylic acid, acrylic acid, hydroxyethyl methacrylate, acrylamide, maleic anhydride, trimellitic anhydride, phthalic anhydride, hemimellitic acid, succinic acid, adipic acid, propiolic acid, propionic acid, fumaric acid, itaconic acid and the like, and derivatives thereof are used. In particular, methacrylic acid and acrylic acid are useful hydrophilic monomer constituting units since they exhibit strong action and effect in this electrodeposition phenomenon, high electrodeposition efficiency by change in pH, and high hydrophilization efficiency.

Various polymers can be used in the present invention, and vinyl-based polymers obtained from vinyl-based monomers, and polyester resins obtained by polycondensation of a polyol with a polycarboxylic acid are listed as suitable examples. The ratio of hydrophilic groups to hydrophobic groups in a polymer is as described above, and in the case of a vinyl-based polymer, if monomers are charged so that the ratio of the number of hydrophobic groups of a monomer unit constituting a vinyl-based polymer to the total number of hydrophobic groups and hydrophilic groups is from 40% to 80%, approximately the same ratio is given also in the resulting polymer. In the case of a polyester resin, a polymer having a hydroxyl group or a carboxyl group at the terminal end is obtained by the polycondensation of a hydroxyl group of a polyol with a carboxyl group of a polycarboxylic acid, and in this case, a polymer having a carboxylic acid at the terminal end is obtained by allowing the charging amount of the polycarboxylic acid to exceed the amount of the polyol. In this case, the number of hydrophobic groups and the number of hydrophilic groups of a monomer unit used in charging are different from those of the resulted polymer. In the present invention, the ratio of hydrophilic groups to hydrophobic groups in the resulting polymer is important.

It is preferable that 50% or more, more preferably 75% or more of hydrophilic group part of monomer units of a copolymer constituting the electrodeposition material is composed of hydrophilic part of a monomer unit which can change from a hydrophilic group to a hydrophobic group reversibly. This hydrophilic group is a functional group which is dissociated into an ion in an aqueous solvent and shows hydrophilicity, and exhibits hydrophobic function by suppression of the ion dissociation due to change in pH of the electrodeposition liquid.

Specific examples of this hydrophilic group which is dissociated into an ion include a carboxyl group, amino group, sulfonic group, quaternary ammonium group, sulfuric ester group and the like, and among them, those having a carboxyl group or an amino group as a hydrophilic group exhibit excellent deposition efficiency of an image in the electrodeposition phenomenon, and show property of forming an electrodeposition film having high fastness. These groups reveal high efficiency in changing reversibly from a hydrophilic group to a hydrophobic group due to change in pH, and are suitable for application to the present invention.

More particularly, when the image pattern generating part is more anodic than the reference electrode, it is preferable that the electrodeposition material has a carboxyl group, the carboxyl group which is a hydrophilic moiety is dissociated into a negative ion group in an aqueous liquid, simultaneously a part of this electrodeposition material is bonded and adhered or associated to the surface of a coloring material particle, and the acid value of the electrodeposition material is in the range from 60 to 300, and optimally, the acid value is in the range from 90 to 150. When the image pattern generating part is more cathodic than the reference electrode, it is preferable that the electrodeposition material has an amino group, the amino group which is a hydrophilic moiety of the electrodeposition material is dissociated into a positive ion group in an aqueous liquid, simultaneously a part of this electrodeposition material is bonded and adhered or associated to the surface of a coloring material particle.

Figure 3:
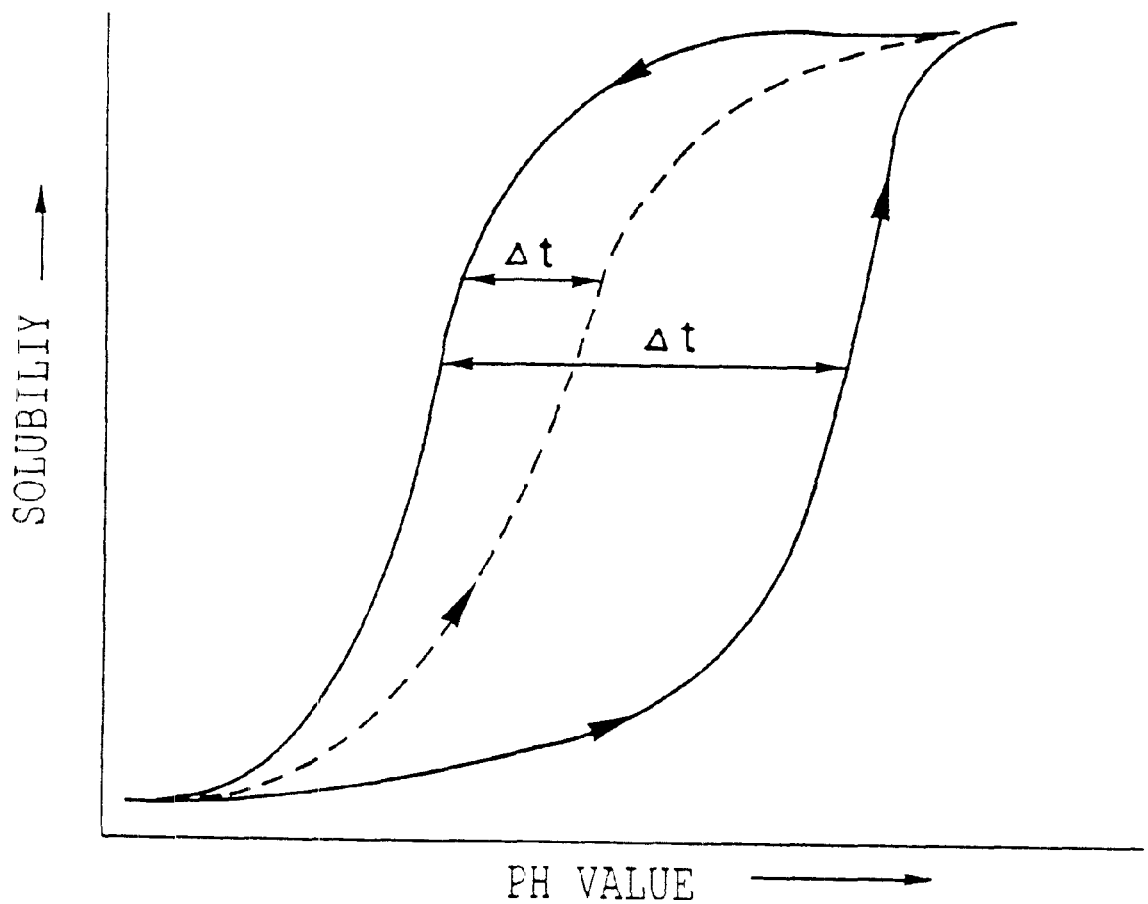
FIG. 3 is a graph showing the water-resistance property of a film and deposition property of an electrodeposition material.

The electrodeposition material containing a hydrophilic group which can perform structural change shows a so-called hysteresis curve as shown in FIG. 3 by a solid line. Namely, re-dissolution is not steeply effected and kept for a certain period of time in deposited condition in the change in pH value, and this property is ideal from the viewpoints of image forming property and the stability of the resulted image. One having such a re-dissolution property, namely, having a large Δt in the graph of FIG. 3 in addition to the deposition property represented by graph A shown in FIG. 1 is preferable. Δt is a measure for revealing the water-resistance of the deposited electrodeposition film (image). The polymer compound represented by a broken line in FIG. 3 has the same structure as that of the copolymer represented by a solid line, and has a molecular weight of less than 4000, and has low water-resistance, therefore, it is easily re-dissolved. A material showing such a re-dissolving property exhibits excellent image forming property, however, the stability of the formed image is somewhat poor, therefore, some ideas are required for maintenance of an image and conveyance of the image to a transfer process to a recording medium.

Not only the properties of a polymer compound but also properties regarding the deposition of a material relate to the formation of such a hysteresis curve. Namely, it is also known that the deposited electrodeposition material is flocculated and a solution is expelled by a lump of the flocculated material, therefore, the amount of water contained in an image formed by the flocculation material and a fine particle coloring material taken into the material is controlled, and for example, even if application of voltage is stopped and pH value of the solution changes again in conveying the formed image to a transferring means for conducting image transfer, the re-dissolving of the electrodeposition material is not initiated immediately, and the stability of the image becomes excellent.

The hydrophobic group in the structure of the electrodeposition material has strong affinity against an organic pigment used as a coloring material, has adsorption ability for a pigment, and imparts excellent pigment dispersing function. This hydrophobic group also imparts printing function which allows an image to be deposited quickly, in removal of hydrophilicity of hydrophilic moiety part of the electrodeposition material by change in pH due to application of voltage. Particularly, when the proportion of the number of hydrophobic groups to the total number of hydrophilic groups and hydrophobic groups is in the range from 40% to 80%, the effect for reducing the electrodeposition electric potential which allows a strong film to be formed is large, and such proportion is an inevitable condition for completing printing process at lower electric potential using photoelectromotive force by input of light.

As the monomer unit containing a hydrophobic group used in this electrodeposition material, an alkyl group, styrene, α-methylstyrene, α-ethylstyrene, methyl methacrylate, butyl methacrylate, acrylonitrile, vinyl acetate, ethyl acrylate, butyl acrylate, lauryl methacrylate and the like, and derivatives thereof are used. In particular, styrene and α-methylstyrene are useful hydrophilic monomer constituting units since they exhibit high hydrophobization efficiency, high electrodeposition efficiency and high controlling property in polymerization in production.

The acid value of the electrodeposition material of the type in which an image is deposited on an anode is suitably in the range from 60 to 300 from the viewpoint that excellent electrodeposition property is obtained. When the acid value of the electrodeposition material is 60 or less, there occur problems that the dissolving property into an aqueous liquid is insufficient, the solid component concentration of the electrodeposition liquid can not be raised to suitable value, the liquid becomes turbid, a precipitate is formed, and the viscosity of the liquid increases. When the acid value of the electrodeposition material is 300 or more, the formed film has lower water-resistance, and the electrodeposition efficiency for the amount of applied electricity is low, and the like.

The electrodeposition material according to the present invention contains, as a main component a polymer compound which is obtained by copolymerization of molecules in the above-described ratio, the molecules containing a hydrophilic group and a hydrophobic group, as described above, and the kind of each hydrophilic group and hydrophobic group is not limited to one. The copolymer may be any of a random copolymer, blocked copolymer and graft copolymer.

When the average molecular weight of this copolymer is from 4,000 to 30,000, an excellent electrodeposition film (deposited image) can be obtained in view of the film property of an electrodeposited film and the adhesion strength of the film. A copolymer having an average molecular weight from 9,000 to 20,000 is suitable in view of a more preferable film property of an electrodeposited film and a more preferable adhesion strength of the film. When the average molecular weight is less than 4,000, the deposited and formed electrodeposition film is not uniform and the water-resistance thereof is low, therefore, the fastness of the formed image is low and there is a fear that the copolymer is not maintained in image-wise fashion and becomes a powder. On the other hand, when the average molecular weight is higher than 30,000, the dissolution property into an aqueous liquid is insufficient, there occur problems that the dissolving property into an aqueous liquid is insufficient, the solid component concentration of the electrodeposition liquid can not be raised to suitable value, the liquid becomes turbid, a precipitation is formed, and the viscosity of the liquid increases.

As a compound having properties in which a pigment itself is dissolved or causes phase changes such as deposition and precipitation by change in conditions, the following compounds are exemplified. For example, Rose Bengal and Eosine which are fluoresceine-based dyes which are in the form of reduced condition and dissolved in water at a pH of 4 or more, and are oxidized to be in a neutralized condition and deposited and precipitated in the range of a pH of less than 4, dye materials having a carboxyl group of which solubility changes largely depending on the hydrogen ion concentration (pH) even if change in structure does not occur (specifically, inkjet dyes of which water-resistance is improved are listed, and these are dissolved in water at a pH of 6 or more and are precipitated at a pH less than 6.), and the like are listed. In addition, an oxadine-based basic dye which is one of quinoneimine dyes: Cathilon Pure Blue 5GH (C. I. Basic Blue 3) and a thiazine-based basic dye: Methylene Blue (C. I. Basic Blue 9) are listed. These are in the form of oxidized condition and develop color at a pH of 10 or less, and are reduced and insolubilized to be deposited at a pH of less than 10. Further, Pro Jet Farst Yellow 2 manufactured by Zeneka Co., Ltd. which is an acidic dye and of which dye itself has electrodeposition forming ability is dissolved easily in pure water (pH 6 to 8) and exists as an anion in the aqueous solution, however, at a pH of 6 or less, it is insolubilized and deposited.

The preferable properties of the electrodeposition material are as described above, and it is preferable that the electrodeposition material constituting the image formation material used in the image forming method of the present invention has all of the above-described properties in good balance.

As the coloring particle used in the image forming method of the present invention, which having average particle diameter is in the range of from 0.01 to 1.2 $\mu$m, preferably in the range of from 0.02 to 0.3 $\mu$m is suitable. If the average particle diameter is smaller than the above-mentioned range, the light screenability of the image layer decreases to an extent that the optical image density tends to drop; the glossiness of the image is more than necessary; and safety problems tend to occur on the other hand, if the average particle diameter is above the above-mentioned range, the dispersibility of the electrodepositable liquid containing the particles of the coloring material worsens to the extent that a deposited material is generated; the uniformity of the image layer containing the particles of the coloring material is not satisfactory; the light screenability by the particles makes the color formability so poor that correspondence with a transmission-type image is impossible; and the image is matted more than necessary. When the average particle size is 0.30 $\mu$m or less, particularly 0.20 $\mu$m or less, dispersion stability as an aqueous dispersion material is excellent and transparency of color is high.

A dye which has no solubility or a low solubility in water or a pigment is suitable as the coloring material in a state of fine particles. Specific examples of the pigment which can be used include inorganic pigments such as carbon black, titanium oxide, zinc white, red iron oxide, alumina white, aluminum powder, bronze powder, zinc oxide, barium sulfate, magnesium carbonate, ultramarine blue, chromium yellow, cobalt blue, and Prussian blue; and organic pigments such as Toluidine Red, Permanent Carmine FB, Fast Yellow G, Disazo Yellow AAA, Disazo Orange PMP, Lake Red C, Brilliant Carmine 6B, Phthalocyanine Blue, Indanthron Blue, Quinacridone Red, Dioxazine Violet, Victoria Pure Blue, Alkali Blue toner, aniline black, Permanent Red 2B, Barium Lithol Red, Quinacridone Magenta, Naphthol Red HF4B, Phthalocyanine Green, and Benzimidazolone Red, oil-soluble dyes such as Victoria Blue 4R Base, Nigrosin, Nigrosin Base, C.I. Solvent Yellow 19, C.I. Solvent Orange 45, and C.I. Solvent Red 8. Further, a disperse dye, a dyed lake pigment, or a resin powder incorporated with a colorant can be listed for obtaining,suitable properties.

These coloring material fine particles may be used as coloring components of a colorless or pale-colored electrodeposition material, or can be used together with a colored electrodeposition material to control the hue of the electrodeposited film.

These electrodeposition materials showed excellent properties in dispersion stability and film property of an electrodeposited film by addition of a surfactant having an ionic substituent, a water-soluble polymer and a polymer having a low polymerization degree.

Examples of water-soluble polymers and polymers having a low degree of polymerization which perform preferable effect as an additive include alkylalkylene oxide carboxylate, alkyloxide carboxylate, alginic acid-modified carboxylate, carboxy-modified methylcellulose, polyacrylic acid-modified carboxylate, acrylic acid-modified carboxylate, polyethylene oxide-modified carboxylate, epoxy-modified carboxylate, polyethanolamine-modified methylcellulose, amine-modified alginate, and amine-modified polyacrylic acid. These are effective as dispersion materials.

The pH regulator used in the present invention has main actions that the pH value of a coloring material dispersed electrodeposition liquid is controlled to a value at which an electrodeposition material is easily deposited and precipitated, a dispersion material is allowed to act efficiently to secure the dispersion stability of a coloring material, solubility into water and a main solvent is easily imparted to an electrodeposition dispersion material, and the like. After an image is formed by an electrodeposition film, it is preferable to remove the pH regulator quickly since the pH regulator has effect to reduce the water-resistance of the electrodeposited image.

In the image forming method of the present invention, a single kind of pH regulator may be used in an aqueous dispersion, or a plurality of pH regulators may be contained. In any case, at least one kind of pH regulator is utilized to control pH toward a pH range wherein the electrodeposition material is easily dissolved in the above-described aqueous dispersion, and it is required that the boiling point of the pH regulator having this action is 150° C. or less. Namely, the reason for this is that when an electrodeposition film is formed in an image supporting member, and this image formed by electrodeposition is allowed to stand with containing the pH regulator, the pH regulator would (re-) dissolve the image formed by electrodeposition and the formed image is degraded.

In this case, when a pH regulator having a boiling point of 150° C. or less is used, this pH regulator is quickly and easily removed when it is allowed to stand in atmosphere or heated in an image transferring process, image fixing process and the like. By this, the pH regulator in an electrodeposition image is removed quickly with a lapse of time by evaporation when allowed to stand naturally, deterioration of an image is prevented, and water-resistance and fastness are improved. Further, by conducting heating treatment after deposition of an electrodeposition film (image formation), the pH regulator is removed more efficiently in a shorter period of time, therefore, time during which the pH regulator exists in the electrodeposition film steeply reduces, deterioration of an image is prevented, water-resistance of an image is extremely improved, and the fastness of an image is largely enhanced. Thus, remarkableeffect is obtained byremoving the pH regulator in the pH range wherein re-dissolving is promoted.

Because of the above-described reasons, when an aqueous dispersion contains a plurality of pH regulators, only pH regulator for controlling the pH range where an electrodeposition material is dissolved may advantageously have a boiling point of 150° C. or less, but the pH regulator for controlling the pH range where an electrodeposition material is deposited and precipitated is not necessarily required to have a boiling point of 150° C. or less.

For heating treatment of the formed image, a method in which an electrodeposition film formed on an image supporting member is directly heated, a method in which an electrodeposition material is transferred to a recording medium by heat treatment, a method in which after an electrodeposition material is transferred to a recording medium, an image formed by the transfer is heated, and the like can be listed. However, the heating method and time during which heating process is performed are not particularly restricted when the removal of the pH regulator can be conducted by appropriate heating treatment. Also regarding the heating method, a contact heating using a roller or plate containing a heater, and non-contact heating using hot air, infrared ray or the like may be permissible, and in the case of the contact heating, a pressure may be applied together, or only heating may be effected.

As the pH regulator which can be suitably used, any regulator can be used if it has the above-described preferable boiling point (not more than 150° C.). However, pH regulators having a boiling point of about 30 to 120° C. are preferable in view of the effect. When the boiling point is over 150° C., there is a fear that the pH regulator remains in the electrodeposition film and the stability of the film is reduced, and when the boiling point is less than 30° C., the stability in the electrodeposition liquid is insufficient, pH in the electrodeposition liquid easily changes, and uniform and stable image formation is difficult.

As the pH regulator which can be suitably used, ammonia (boiling point: not more than −33.4° C., hereinafter shown in brackets), methylaminoethanol (135° C.), dimethylaminoethanol (134° C.), ethylaminoethoanol, ethylenediamine (116.5° C.), propylenediamine (119.3° C.), methylamine (−6.3° C.), dimethylamine (−93.0° C.), trimethylamine (3.4° C., 755 mmHg) monoethylamine (16.6° C.), diethylamine (55.5° C.), triethylamine (89.4° C., 760 mmHg), propylamine (49.7° C.), dipropylamine (109.2° C.), butylamine (78° C.), pentylamine (104.5° C.), hydrogen chloride (−85° C.), formic acid (101° C.), acetic acid (118° C.), hydrochloric acid (−85° C.) and the like are listed. The measuring method of boiling point, known methods can be applied, and in the case of a simple body, values described in literatures such as Chemical Handbook and the like can be referred.

As the aqueous solvent which can be used together with the above-described electrodeposition material and coloring particle, water; alcohols such as methanol, ethanol, butanol, and isopropyl alcohol; ketones such as acetone and methyl ethyl ketone; amines such as ethanol amine, dimethyl amine, and triethanol amine; and acids such as acetic acid, sulfuric acid, hydrochloric acid, phosphoric acid, oxalic acid, and phthalic acid can be used alone or in combination of two or more, and in particular, a mixed solvent whose main component is water is very useful from the viewpoints of safety, stability, and cost.

It is preferable to compound a water-soluble solvent as a wetting material for preventing modification of an electrodeposition liquid due to evaporation of an aqueous solvent component. As this water-soluble solvent, a liquid which is highly hydrophilic and has an azeotropic point with water, a high boiling point and a low vapor pressure may be advantageous. Preferably, the liquid is a solvent which has a high polarity and which has a boiling point of 150° C. or higher and a saturated vapor pressure of 100 mmHg or lower at room temperature under atmospheric pressure, and preferably a boiling point of 150° C. or higher and a saturated vapor pressure of 60 mmHg or lower under atmospheric pressure. Outside this range, evaporation of the electrodeposition liquid is high, the life of the dispersion is shorter and a stable deposition performance cannot be obtained because the properties of the liquid largely change. The composition ratio is preferably in the range of from 0.5 to 70% by weight, and more preferably in the range of from 5 to 30% by weight. Specific and typical examples thereof include ethylene glycol, diethylene glycol, polyethylene glycol, glycerin, diacetone alcohol, methyl cellosolve, ethyl cellosolve, butyl cellosolve, and ethylene glycol diacetate.

The addition of a polymeric additive and an emulsion imparts a stable film forming property at the time of electrodeposition and is very effective in improving the film properties of the electrodeposition film, in improving the fastness of the electrodeposition image and in controlling the electrical resistance of the film. The amount to be added is preferably in the range of from 0.2 to 50% by weight, and more preferably in the range of from 1 to 15% by weight, based on solids.

Typical examples of the polymeric additive include gelatin, guni arabic, pectin, casein, starch, microcrystalline cellulose, alginates, polyvinyl alcohol, vinyl acetate copolymers, polyacrylic acid copolymers, and derivatives of methyl cellulose.

Typical examples of the emulsion include polyvinyl acetate emulsions, vinyl acetate copolymer emulsions, acrylate copolymer emulsions, and synthetic rubber latex.

Besides these, it is possible to add a preservative, an anti-mold agent, a very small amount of a surfactant, an agent which adjusts the viscosity of the liquid, and the like. It is preferable to add the preservative and the anti-mold agent to the aqueous liquid from the viewpoint of the stability of the liquid, because the aqueous liquid is liable to deteriorate due to the growth of microorganisms and molds since an aqueous liquid is used as the dispersion medium in the present invention.

Preferable image forming conditions in the image forming method of the present invention and an apparatus which is suitably used in the method are illustrated below.

For voltage difference to be applied between an electrode and an image supporting member in the image forming (electrodeposition) process in the method of the present invention, a direct current power source having a value less than ±9 V is often used. In order to reproduce each pixcel sharply of an image, signals can be inputted using direct current pulse at a short time interval and the short pulse in combination. As the voltage difference to be applied, a direct power source having a value of 3 V or less is more preferably used, and when film property is important, direct power source having a value of 2.5 V or less is used. When a voltage difference of 9 V or more is applied, generation of bubbles due to electrolysis of a solution from the surface of an electrode in the liquid is intense, electric field distribution on the surface of the electrode becomes ununiform, the film property of a film itself becomes ununiform, the surface of the film becomes uneven due to defoaming phenomenon of bubbles, and intended reproduction of an image having fine pattern is difficult.

There is electrodeposition coating as a technology resembling the image forming process of the present invention, and in general, in this electrodeposition coating, a voltage of 50 V or more is applied. The reason for this is that if voltage applied is low, the resistance of the formed electrodeposition film may sometimes be high, the electrodeposition film forming speed lowers largely with progress of the electrodeposition film formation and required film thickness (generally, 30 μm or more) can not be obtained, therefore, high voltage is applied and intense foaming phenomenon is allowed to occur by electrolysis for avoiding the above-described defects, stirring near the surface of an electrode is conducted and the surface of the electrode is brought into contact with new electrodeposition liquid by utilizing the phenomenon, to obtain a film thickness required as the electrodeposition coating.

The aim of the present invention is reproduction of an image having high image quality, specifically, reproduction of a fine image (400 dpi or more) pattern having a film thickness level of 2 μm or less, therefore, the bubbling phenomenon due to electrolysis of an electrodeposition liquid is required to be suppressed, and if any, it should be suppressed to a level which does not exert influence on the reproduction of a fine image pattern. By this, the voltage difference applied becomes a direct current of 5 V or less, in more fine image (800 dpi or more) printing, preferably 3 V or less, and when image quality is regarded important, 2.5 V or less. Further, as the voltage applying means, triple-electrode method may sometimes be used in which the stability of voltage is taken into consideration. Further, since image forming can be conducted by application of such small voltage difference, a mechanism which converts an inputted photo-image signal into current can be used in the image forming process of the present invention.

Namely, photoelectromotive force is usually 1 V or less, and for example, in a widely used apparatus using a silicon-based material, from about 0.6 to 0.7 V, and when it is considered that bias voltage is from about 2 to 5, it can be understood that the image forming method of the present invention can be suitably used for input of a photo image signal.

In the case of writing with light, structure is formed in which an image supporting member is composed of at least a flat electrode layer and photoconductive material layer, and current flows on the surface of the image supporting member in the area irradiated with light and electrodeposition phenomenon of a coloring material particle occurs.

Then, an image recording apparatus which can be suitably used in the image recording method of the present invention will be described. FIG. 4 is a schematic view showing the image recording apparatus of the present invention used in Example 1 and Example 14 described later. In this image recording apparatus, an image supporting member 3 composed of a plane member equipped with a work electrode into which an image signal can be inputted from the rear surface is placed in an electrodeposition liquid bath 1 filled with an aqueous coloring material liquid 1 for electrodeposition so that the rear surface is out of the liquid bath, and a counter electrode 5, and control electrode 6 utilizing a salt bridge is also place in the same bath. This image supporting member 3 is made by a lamination structure in which a transparent conductive layer of ITO is given on a 4 mm plate glass substrate and two layers of an organic photoconductor are given on the transparent layer, and the ITO conductive layer is a work electrode, and the surface of the organic photoconductive layer has no unevenness and is smooth. Each electrode is connected to a potentiostat power source 4, and voltage is applied between the rear surface of the image supporting member 3 and the counter electrode 5 by the potentiostat power source 4 with inputting an image to photoimage input part on the rear surface of the image supporting member 3 and an electrodeposition material in an electrodeposition liquid is allowed to be deposited together with a coloring material particle onto the surface of the image supporting member 3 to form an image. The image herein recorded can also be transferred and fixed to a transfer material such as plain paper or plastic film, if necessary.

Figure 5:
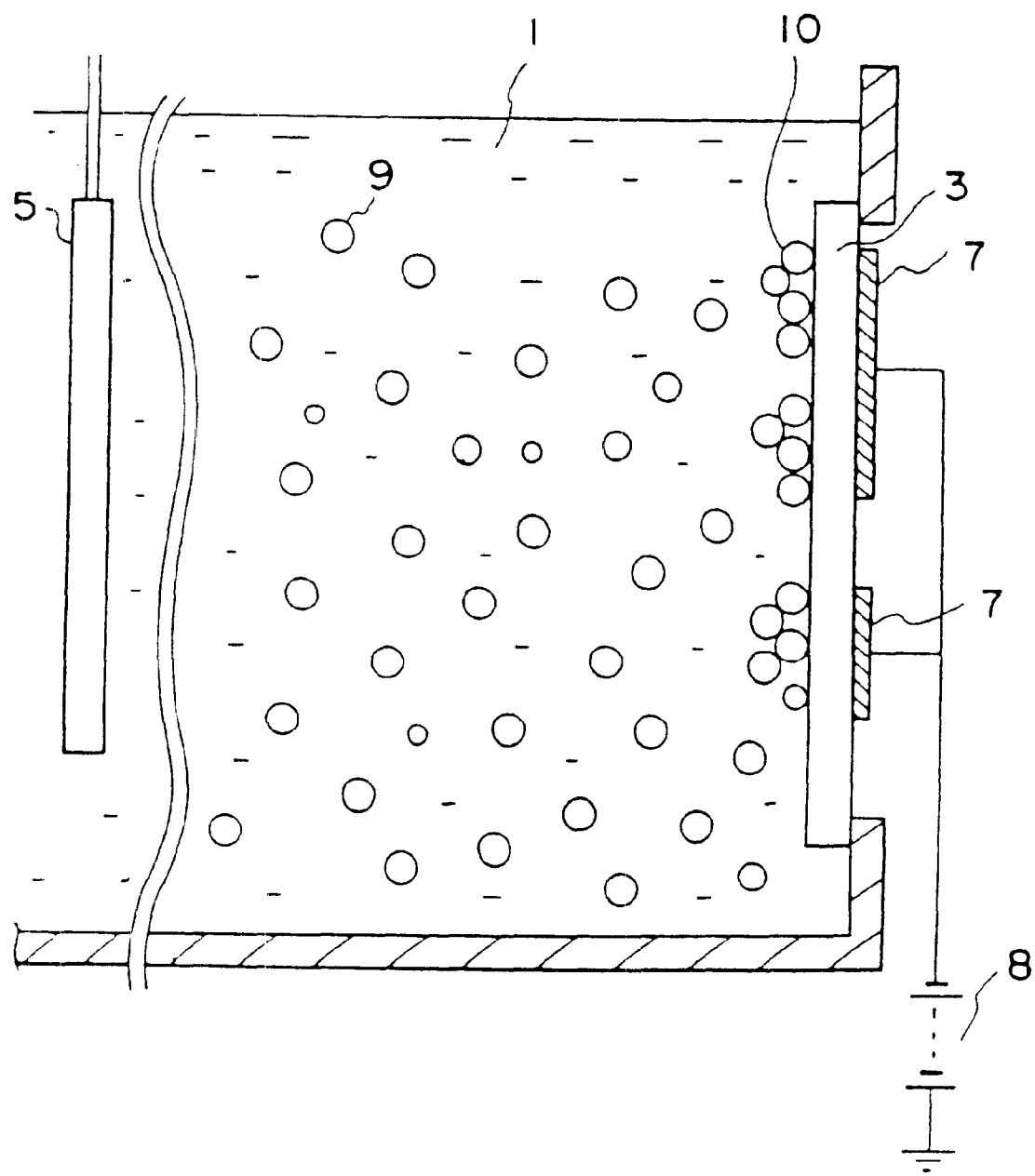
FIG. 5 is a schematic view showing image recording phenomenon by deposition of an electrodeposition material.
Figure 6:
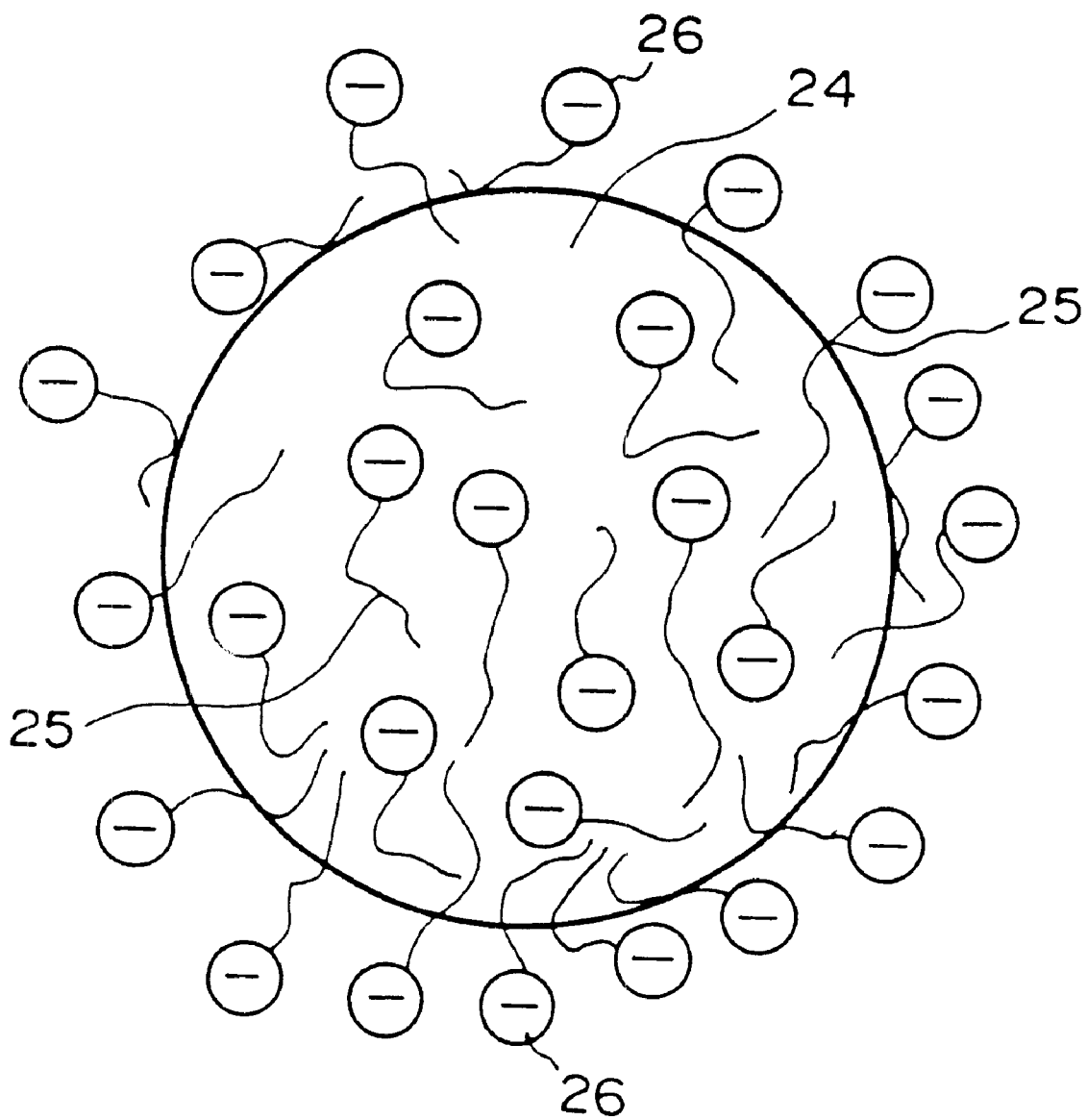
FIG. 6 is a schematic view showing the structure of an electrodeposited particle in an electrodeposition liquid.

This image recording method will be described in detail. FIG. 5 is a schematic view showing image recording phenomenon by deposition of an electrodeposition material. When voltage is applied from a direct current power source 8 to a pseudo current supply electrode 7 placed image wisely on the image supporting member 3, pH of an electrodeposition liquid 1 near the electrode 7 changes, and electrodeposition material 9 containing a coloring particle dissolved and dispersed into the electrodeposition liquid 1 is deposited on the surface of the image supporting member 3, and a polymer compound containing the coloring material deposited in the form of an image is adhered to record an image 10. FIG. 6 is a schematic view showing the structure of the electrodeposition particle in the electrodeposition liquid. In the electrodeposition liquid, it is assumed that polymer compound 25 constituting the electrodeposition material exists near the surface of a coloring particle 24 so as to cover the particle, and a part thereof exists as free ions 26 in the electrodeposition material.

Figure 7A:
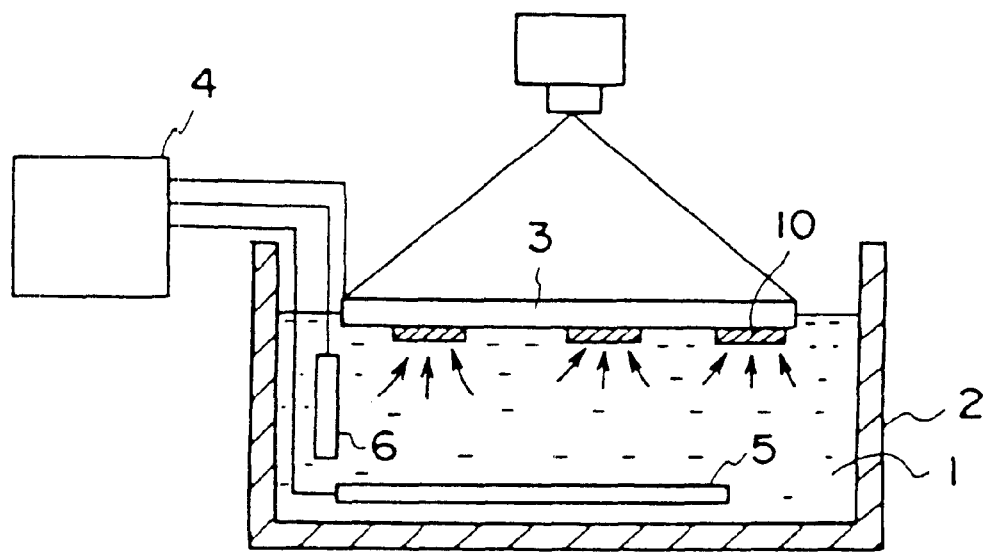
FIG. 7A to FIG. 7C are schematic views showing processes in the image forming method of the present invention.
Figure 7B:
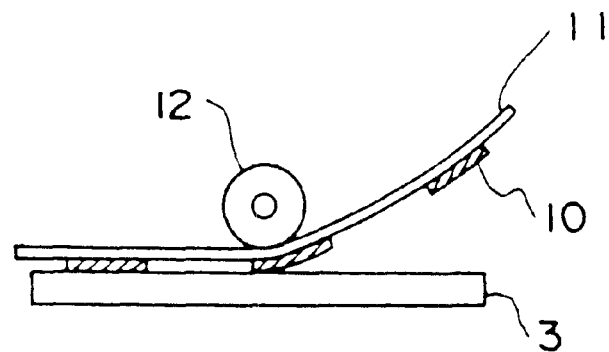
Figure 7C:
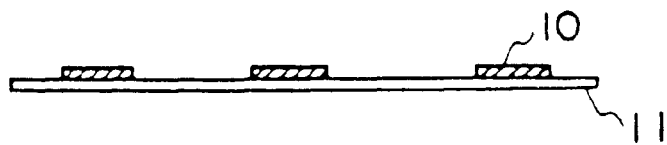

Next, process in which thus recorded image is transferred and fixed to an other recording medium will be described. FIG. 7(A) is a schematic view showing the above-described image recording process. The formed image 10 is supported on the recording material deposited on the surface of the image supporting member 3. FIG. 7(B) is a schematic view showing an image transferring process. Plain paper 11 which is a transfer material is laminated on the image supporting member 3 taken out of the aqueous electrodeposition liquid, pressed by a transfer roller 12, and further, preferably heated and pressed, to allow the image to be transferred and fixed on the plain paper 11. FIG. 7(C) shows the image 10 transferred and fixed on the plain paper 11, and thus recording of an image onto plain paper (transfer material) 11 is completed.

As to the image supporting member to be used in the present invention, the requirements are that the surface on which images are formed is highly smooth and free from unevenness so as to obtain good printing performance and that the surface energy is low so as to obtain good transfer performance. In addition, these properties are also important from the viewpoint of the prevention of the image retention in the case where the image supporting member is used repeatedly to form a different image.

More specifically, in order to obtain good transferability, the surface roughness (Ra) of the surface of the image supporting member is in the range of from 0.01 to 1.5 μm, and preferably in the range of from 0.06 to 0.5 μm. In addition, in order to obtain good transferability, the critical surface tension of the surface of the image supporting member is in the range of from 35 dyne/cm or less, and preferably in the range of from 20 to 29 dyne/cm.

By this viewpoint, it is necessary to form a low surface energy layer on the surface of the image supporting member, and examples of the material providing such a surface layer include a fluororesin, a fluororubber (FEP), a dimethylsiloxane resin, a silicone rubber, wax-based materials and the like, and a composite material comprising any of these materials and an electrically conductive powder so as to control the electrical resistance of the layer itself.

The image supporting member having a surface which has high smoothness as described above, and has low surface energy can provide excellent printing property. Particularly, this property will be an important property if the image supporting member is used repeatedly. These properties improve the physical cleanability of the image on the image supporting member. As a result, even if the image is different for every recording, it is possible to establish a printing cycle which is free from the hysteresis of the image information of the preceding recording.

In the image forming process, it is preferable to conduct stirring in the liquid bath for maintaining uniformity of the liquid property of the bath of the electrodeposition liquid, in view of ability of formation an image (electrodeposition film) having uniformity. When the stirring is too strong, film formation may be delayed and liquid scattering may occur, therefore, it is necessary to select suitable stirring conditions with considering the conditions of the liquid.

A more uniform excellent film property can be obtained by controlling the liquid temperature. Since this phenomenon itself is affectedby the liquid temperature, when reproduction of high quality image is intended, it is necessary to provide a liquid temperature control system particularly having high accuracy.

The image formed on the flat surface of the image supporting member in the image forming process can be transferred to another recording medium. In the transfer process of an image, the formed image (electrodeposition film) is transferred to a transfer medium such as plain paper and the like from the image supporting member using electrostatic force, pressure, adhesiveness, or the like.

Particularly, in the image transfer process, by conducting image transfer under conditions containing a suitable amount of the liquid component of the electrodeposition liquid in forming a film, the transferred image material exhibits property having viscous property, and only pressure in the transferring process of an image can generate viscous deformation of the image and transfer is made possible. By this, image forming process can also be made wherein the whole system is more compact and unnecessary energy is not consumed.

If the image supporting member is in a shape of a belt, the recording of image can be performed effectively because the recording, transfer to the transfer-receiving medium and fixing of an image can be performed continuously.

When preparing such a belt-shaped image supporting member, the materials for the substrate are, for example, polymers, such as polyimide resins and modified compounds thereof, polyaramide resins and modified compounds thereof, and silicone resins and modified compounds thereof as well as materials composed mainly of these polymers. If the image supporting member is in the shape of a belt, the coloring material adhering to the surface can be effectively removed by bending the belt at an acute angle, which makes it possible to improve the physical cleanability of the image on the image supporting member. As a result, even if the image is different for every recording, it is possible to establish a printing cycle which is free from the hysteresis of the image information of the preceding recording.

Figure 8:
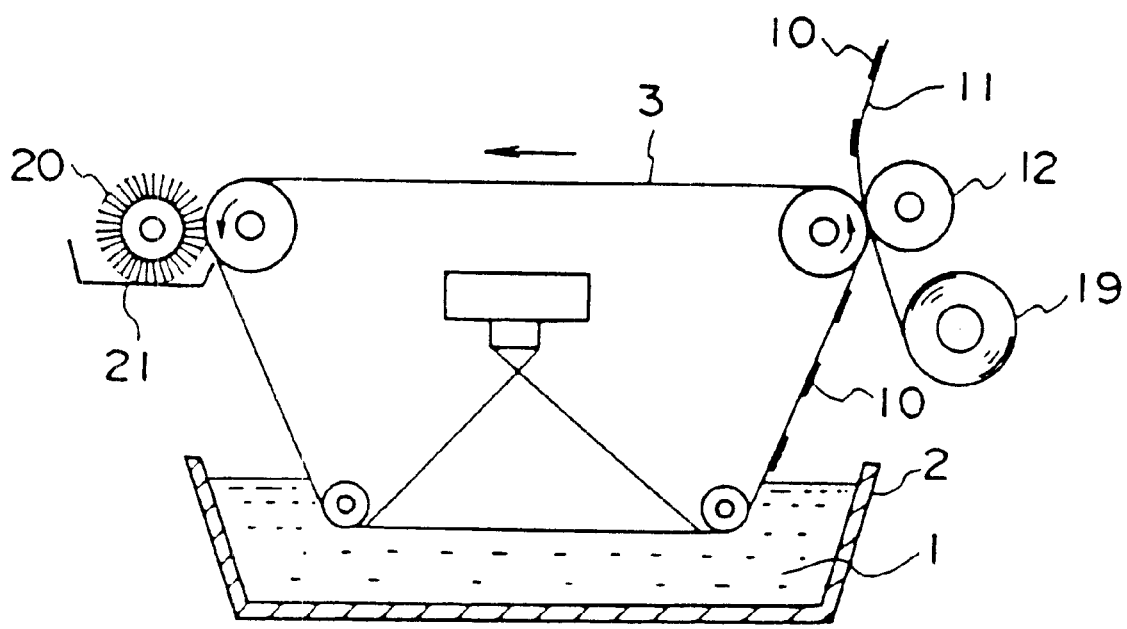
FIG. 8 is a schematic view showing one embodiment of the image recording system of the present invention using an image recording apparatus having an image supporting member in a shape of belt.

FIG. 8 is a schematic diagram illustrating one embodiment of the image recording apparatus system according to the present invention. Since the image supporting member 3 is in the shape of a belt, an image 10, which is recorded by receiving an optical signal in the aqueous coloring material liquid 1, is conveyed forward while being adhered to the surface of the belt-shaped image supporting member 3. In the transferring section, the image 10 is transferred to a paper 11 supplied from a paper roll 19 when the image 10 passes through a gap between pressing and heating rolls 12. The colorant remaining on the image supporting member 3 is removed with a cleaning brush 20 and is accumulated in a bowl 21 for cleaning waste. The image supporting member 3, after being cleaned by the cleaning brush 20, is again used for image recording.

When the image supporting member is made in the form of a belt and continuously used as described above, it is preferable to remove the coloring material, electrodeposition material and the like remaining on the surface of the plain member after completion of the image forming process and image transferring process and before the image forming process is effected again. For removing the image forming material remaining on the surface of the plain member of the image supporting member, known cleaning methods such as a blade-cleaning method, fur-brushing method, elastic roller method, cleaning web method, liquid washing method and the like can be applied.

The image forming method is a recording method in which an image supporting member which generates current corresponding to a photoimage signal is placed in a liquid containing a coloring particle in an aqueous medium, and electrodeposition phenomenon is allowed to occur corresponding to the image current and an image containing ionic coloring material particle group is formed on the surface of the image supporting member, and an image forming method also containing a post process in which the recorded image is transferred to a receiving medium. In particular, it is an image forming method in which the transferring process is conducted when an image adhered onto the surface of the image supporting member contains the liquid component of the electrodeposition liquid, and since an image having photoimage quality having high resolution can be formed by applying a low voltage, the process has wide application.

EXAMPLES

The following examples further illustrate the present invention in detail but do not limit the present invention.

Example 1

90 parts by weight of 20% by weight aqueous alkali solution of a styrene-acrylic acid copolymer (molecular weight: 13,000, hydrophobic group/(hydrophilic group+ hydrophobic group) molar ratio: 65%, acid value: 150), 11 parts by weight of carbon black powder (having an average particle diameter of 0.08 μm), 15 parts by weight of diethylene glycol, 7 parts by weight of isopropanol, and 15 parts by weight of distilled water were mixed, and moderately stirred for 1 hour by means of a propeller to sufficiently wet the carbon black powder with the liquid and thus to prepare a dispersion containing roughly dispersed carbon black powder. This dispersion was then subjected to an intensive, forced-dispersing treatment using a homogenizer for 6 minutes to prepare a base dispersion. Into this base dispersion was dropwise added a dilute solution containing 60 parts by weight of distilled water, 10 parts by weight of glycerin, and 0.8 parts by weight of an anti-mold agent ((Proxycel XL-2 manufactured by ICI Inc.) while the liquid was stirred with a propeller. In this way, a dispersion containing fine particles of a coloring material for use in electrodeposition was prepared. The pH of this liquid was set to 7.9 by adjusting pH using an aqueous solution of phosphoric acid and an aqueous solution of sodium hydroxide. The pH at which the fine particles of the coloring material started depositing from the liquid was 6.2. The pH at which precipitation leaving a complete supernatant occurred was 5.7. The resistivity of the liquid was $5 \times 10^2$ Ω·cm.

In the image recording apparatus as illustrated in FIG. 4, this aqueous coloring material liquid was used to record an image. As shown in FIG. 4, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 3 mm thick plate glass substrate having a transparent electrically conductive layer of ITO formed thereon, and the transparent electrically conductive layer was covered with two organic photoconductive layers. The electrically conductive layer of ITO functioned as a working electrode and the surface of the organic photoconductive layer was smooth without unevenness. The respective electrodes were connected to a potentiostat power source. An image signal was inputted into an optical image inputting section on the rear surface of the image supporting member while a DC voltage of 2.7 V was applied between the working electrode and the counter electrode for 5 seconds by means of the potentiostat power source.

Next, the image supporting member which had completed this image formation procedure was withdrawn from the liquid, and it was confirmed that a high quality image having an optical image density of 1.43 was formed on the surface of the image supporting member.

Example 2

120 parts by weight of 20% by weight aqueous alkali solution of a α-styrene-methacrylic acid copolymer (molecular weight: 17,000, hydrophobic group/(hydrophilic group+hydrophobic group) molar ratio: 70%, acid value: 160), 20 parts by weight of carbon black powder (having an average particle diameter of 0.07 μm), 10 parts by weight of polyethylene glycol, 10 parts by weight of isopropanol, and 20 parts by weight of distilled water were mixed, and moderately stirred for 1 hour by means of a propeller to sufficiently wet the carbon black powder with the liquid and thus to prepare a dispersion containing roughly dispersed carbon black powder. This dispersion was then subjected to a dispersing treatment using a ball mill for 35 hours to prepare a base dispersion. Into this base dispersion was dropwisely added a diluted mixture of a dilute solution containing 100 parts by weight of distilled water, 20 parts by weight of glycerin, and 0.5 parts by weight of an anti-mold agent ((Proxycel XL-2 manufactured by ICI Inc.) while the mixture was stirred with a propeller. In this way, a dispersion containing fine particles of a coloring material for use in electrodeposition was prepared. The pH of this liquid was set to 8.1 by adjusting pH using an aqueous solution of phosphoric acid and an aqueous solution of ammonia. The pH at which the fine particles of the coloring material started depositing from the liquid was 6.3. The pH at which precipitation leaving a clear supernatant occurred was 5.9. The resistivity of the liquid was $2 \times 10^2$ Ω·cm.

Figure 9:
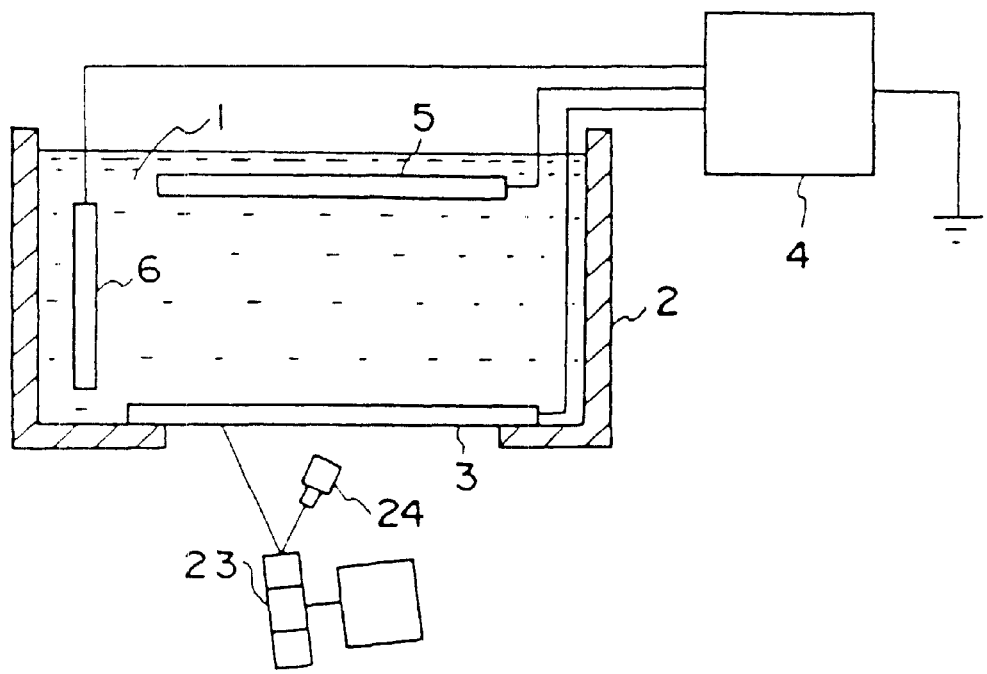
FIG. 9 is a schematic view showing an image recording apparatus equipped with a laser generating apparatus used for image recording in Examples 2, 8, 9 and 15.

The image recording apparatus as illustrated in FIG. 9 was used, and, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 2 mm thick plate quartz substrate having a transparent electrically conductive layer of ITO formed thereon, and the transparent electrically conductive layer was covered with two organic photoconductive layers. The electrically conductive layer of ITO functioned as a working electrode and the surface of the organic photoconductive layer was smooth. The respective electrodes were connected to a potentiostat power source. An image signal was inputted into an optical image inputting section on the rear surface of the image supporting member by a He—Ne laser ray 23 which was radiated from a laser source 22, while a DC pulse voltage of 2.9 V (pulse width 3 ms/pulse cycle 4 ms) was applied between the working electrode and the counter electrode by means of the potentiostat power source 4.

Next, the image supporting member which had completed this image formation procedure was withdrawn from the liquid, and it was confirmed that a high quality image having an optical image density of 1.48 was formed on the surface of the image supporting member.

Example 3

150 parts by weight of 20% by weight aqueous alkali solution of a styrene-α-styrene-acrylic acid copolymer (molecular weight: 11,000, hydrophobic group/(hydrophilic group+hydrophobic group) molar ratio: 72%, acid value: 140) 10 parts by weight of phthalocyanine powder (having an average particle diameter of 0.2 μm), 6 parts by weight of a water-soluble acrylic resin, and 10 parts by weight of isopropanol were mixed, and moderately stirred for 0.5 hours by means of a propeller to sufficiently wet the carbon black powder with the liquid and thus to prepare a dispersion containing roughly dispersed carbon black powder. This dispersion was then subjected to a dispersing treatment using a homogenizer for 10 hours to prepare a base dispersion. Into this base dispersion was dropwisely added a diluted mixture of a dilute solution containing 100 parts by weight of distilled water, 20 parts by weight of diethylene glycol, and 0.5 parts by weight of an anti-mold agent ((Proxycel XL-2 manufactured by ICI Inc.) while the mixture was stirred with a propeller. In this way, a dispersion containing fine particles of a coloring material for use in electrodeposition was prepared. The pH of this liquid was set to 7.7 by adjusting pH using an aqueous solution of phosphoric acid and an aqueous solution of lithium hydroxide. The pH at which the fine particles of the coloring material started depositing from the liquid was 6.3. The pH at which precipitation leaving a clear supernatant occurred was 5.9. The resistivity of the liquid was $9 \times 10^2$ Ω·cm.

Figure 10:
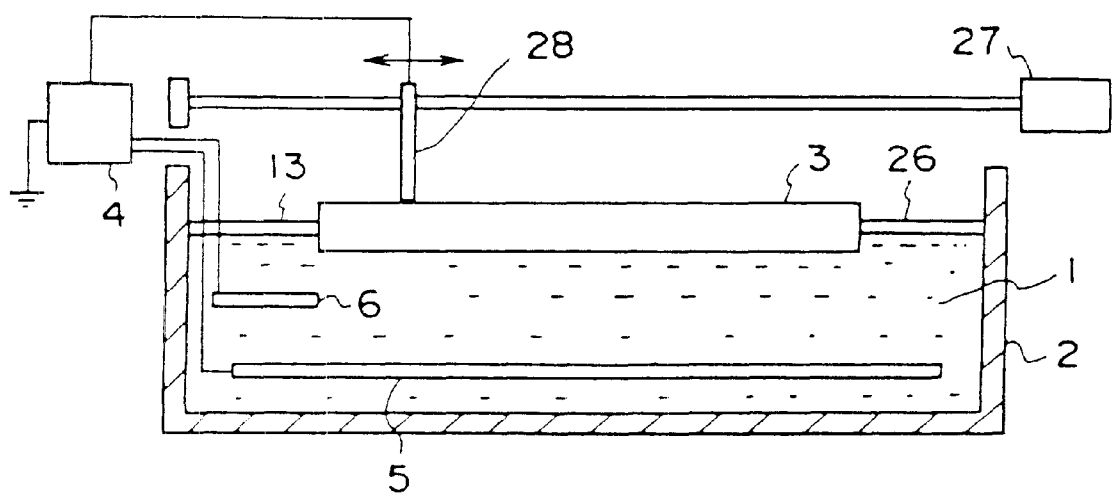
FIG. 10 is a schematic view showing an image recording apparatus equipped with an LED printing head used for image recording in Examples 3 and 16.

The image recording apparatus as illustrated in FIG. 10 was used, and, in an electrodeposition bath 2 filled with the electrodeposition liquid 1 was disposed an image supporting member 3 into which an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a 5 mm thick electrically conductive layer of which current dispersion had been suppressed and the surface in contact with liquid of the electrically conductive layer was smooth. The respective electrodes were connected to a control power source. An image signal was inputted into an image inputting section using a needle electrode image inputting printing head 28 of 600 DPI, while a DC pulse voltage of 3.1 V (pulse width 2 ms/pulse cycle 3 ms) was applied between the needle electrode and the counter electrode in synchronization with the scanning speed of the printing head 28.

Next, the image supporting member which had completed this image formation procedure was withdrawn from the liquid, and it was confirmed that a cyan-colored high quality image having an optical image density of 1.53 was formed on the surface of the image supporting member. Further, printing was conducted, while a DC pulse voltage of 2.3 V was applied between the needle electrode and the counter electrode, and it was confirmed that a cyan-colored high quality image having an optical image density of 1.15 was formed on the surface of the image supporting member.

Example 4

220 parts by weight of 20% by weight aqueous alkali solution of a styrene-maleic anhydride copolymer (molecular weight: 8,000, hydrophobic group/(hydrophilic group+hydrophobic group) molar ratio: 62%, acid value: 190), 20 parts by weight of carbon black powder (having an average particle diameter of 0.07 $\mu$m), 10 parts by weight of polyethylene glycol, 3 parts by weight of a water-soluble acrylic resin, 10 parts by weight of isopropanol, and 50 parts by weight of distilled water were mixed, and moderately stirred for 3 hours by means of a propeller to sufficiently wet the carbon black powder with the liquid and thus to prepare a dispersion containing roughly dispersed carbon black powder. This dispersion was then subjected to a dispersing treatment using a ball mill for 24 hours to prepare a base dispersion. Into this base dispersion was dropwisely added a dilute solution containing 80 parts by weight of distilled water, 10 parts by weight of glycerin, 4 parts by weight of pyrrole and 0.5 parts by weight of an anti-mold agent ((Proxycel XL-2 manufactured by ICI Inc.) while the liquid was stirred with a propeller. In this way, a dispersion containing fine particles of a coloring material for use in electrodeposition was prepared. The pH of this liquid was set to 7.8 by adjusting pH using an aqueous solution of phosphoric acid and an aqueous solution of ammonia. The pH at which the fine particles of the coloring material started depositing from the liquid was 5.9. The pH at which precipitation leaving a clear supernatant occurred was 5.4. The resistivity of the liquid was $1 \times 10^2$ $\Omega \cdot$cm.

The same apparatus as in Example 1 as illustrated in FIG. 4 was used, and, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 2 mm thick plate quartz substrate having a transparent electrically conductive layer of ITO formed thereon, and the transparent electrically conductive layer was covered with two organic photoconductive layers. The electrically conductive layer of ITO functioned as a working electrode and the surface of the organic photoconductive layer was smooth. The respective electrodes were connected to a potentiostat power source. An image signal was inputted into an optical image inputting section on the rear surface of the image supporting member by a He—Ne laser ray 23, while a DC pulse voltage of 2.2 V was applied between the working electrode and the counter electrode by means of the potentiostat power source 4.

Next, the image supporting member which had completed this image formation procedure was withdrawn from the liquid, and it was confirmed that a high quality image having an optical image density of 1.26 was formed on the surface of the image supporting member.

Example 5

According to the same manner as in Example 1, a dispersion for electrodeposition was prepared, the image forming process was conducted, the image supporting member on which surface an image had been formed was taken out from the electrodeposition bath, and plain paper was placed on the surface of the image supporting member on which an image containing the coloring material particle had been formed. Corona discharge of +6 KV was effected from this paper, then, the plain paper and the image supporting member were sandwiched between a pair of rubber rollers at a linear load of 500 g/cm by applying pressure and conveyed by the rotation of the rollers. Directly after the application of pressure, the plain paper was peeled from the image supporting member, and a transferred image having an optical image density of 1.36 was formed on the plain paper.

Example 6

180 parts by weight of 20% by weight aqueous alkali solution of a styrene-acrylate-acrylic acid copolymer (molecular weight: 16,000, hydrophobic group/(hydrophilic group+hydrophobic group) molar ratio 2.0, acid value: 180), 15 parts by weight of carbon black powder (having an average particle diameter of 0.07 $\mu$m), 15 parts by weight of glycerin, 7 parts by weight of isopropanol, and 55 parts by weight of distilled water were mixed, and moderately stirred for 1 hour by means of a propeller to sufficiently wet the carbon black powder with the liquid and thus to prepare a dispersion containing roughly dispersed carbon black powder. This dispersion was then subjected to an intensive, forced-dispersing treatment using a homogenizer for 3 minutes to prepare a base dispersion. Into this base dispersion was dropwisely added a dilute solution containing 100 parts by weight of distilled water, 80 parts by weight of vinyl acetate emulsion aqueous solution and 0.6 parts by weight of an anti-mold agent ((Proxycel XL-2 manufactured by ICI Inc.) while the liquid was stirred with a propeller. In this way, a dispersion containing fine particles of a coloring material for use in electrodeposition was prepared. The pH of this liquid was set to 7.8 by adjusting pH using an aqueous solution of phosphoric acid and an aqueous solution of sodium hydroxide. The pH at which the fine particles of the coloring material started depositing from the liquid was 5.9. The pH at which precipitation leaving a clear supernatant occurred was 5.6. The resistivity of the liquid was $5 \times 10^2$ $\Omega \cdot$cm.

Then, as illustrated in FIG. 4, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 4 mm thick blue glass plate substrate having a transparent electrically conductive layer of ITO formed thereon, and the transparent electrically conductive layer was covered with two organic photoconductive layers. The electrically conductive layer of ITO functioned as a working electrode and the surface of the organic photoconductive layer was smooth. The respective electrodes were connected to a potentiostat power source.

An image signal was inputted into an optical image inputting section on the rear surface of the image supporting member, while a DC pulse voltage of 2.6 V was applied between the working electrode and the counter electrode for 9 seconds by means of the potentiostat power source 4.

Next, the image supporting member which had completed this image formation procedure was withdrawn from the liquid, and it was confirmed that a high quality image having an optical image density of 1.48 was formed on the surface of the image supporting member. Then, a rubber eraser scrubbing fixing test was conducted, and change in optical density of the printing sample was 0.2. On the other hand, the same fixing test was conducted on the printing sample in Example 1, and change in optical density of the printing sample was 0.5. By this, it was confirmed that fixing property was improved by addition of the emulsion aqueous solution.

Example 7

90 parts byweight of 20% byweight aqueous alkali solution of a styrene-acrylic acid copolymer (molecular weight: 13,000, hydrophobic group/(hydrophilic group+ hydrophobic group) molar ratio: 68%, acid value: 150), 11 parts by weight of carbon black powder (having an average particle diameter of 0.08 μm) 7 parts by weight of isopropanol, and 15 parts by weight of distilled water were mixed, and moderately stirred for 1 hour by means of a propeller to sufficiently wet the carbon black powder with the liquid and thus to prepare a dispersion containing roughly dispersed carbon black powder. This dispersion was then subjected to an intensive, forced-dispersing treatment using a homogenizer for 3 minutes to prepare a base dispersion. Into this base dispersion was dropwisely added a dilute solution containing 140 parts by weight of distilled water, and 0.3 parts by weight of an anti-mold agent ( (Proxycel XL-2 manufactured by IC Inc.) while the liquid was stirred with a propeller. In this way, a dispersion containing fine particles of a coloring material for use in electrodeposition was prepared.

Then, the same apparatus as in Example as illustrated in FIG. 4 was used, and in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. An image signal was inputted into an optical image inputting section on the rear surface of the image supporting member, while a DC pulse voltage of 2.5 V was applied between the working electrode and the counter electrode for 7 seconds by means of the potentiostat power source 4.

Next, the image supporting member which had completed this image formation procedure was withdrawn from the liquid, and it was confirmed that a high quality image having an optical image density of 1.36 was formed on the surface of the image supporting member.

The electrodeposition recording apparatus filled with the above-described electrodeposition liquid of this example and the same electrodeposition recording apparatus filled with the electrodeposition liquid of Example 1 were allowed to stand as they were for 1 week. As a result, the liquid surface of the electrodeposition recording apparatus of this example lowered by 25 mm, and the liquid surface of the electrodeposition recording apparatus of Example 1 lowered only by 9 mm. Namely, it was confirmed that addition of wetting agents such as diethylene glycol, isopropanol and the like was effective for preservability of liquid property.

Example 8

The same electrodeposition liquid as in Example 1 was completed in the same manner as in Example 1.

Then the same apparatus as in Example 2 as shown in FIG. 9 was used, and an image signal was inputted into an optical image inputting section on the rear surface of the image supporting member by a He—Ne laser ray 23, while a pulse DC pulse voltage of 2.0 V (pulse widthe 2 ms/pulse cycle 3 ms) was applied between the working electrode and the counter electrode by means of the potentiostat power source 4. In this example, a propeller for stirring was inserted into the electrodeposition bath and the image formation was conducted under the same conditions as in Example 2 with conducting slight stirring of the electrodeposition liquid in the bath.

Then the image supporting member which had completed this image formation was taken out, and it was confirmed that an image having an optical image density of 1.48 was formed on the surface of the image supporting member and the optical density distribution δ at solid part was 0.04. On the other hand, regarding the image formed in Example 1, it was confirmed that an image having an optical image density of 1.42 was formed on the surface of the image supporting member and the optical density distribution δ at solid part was 0.09 in the same evaluations. Therefore, it was found that slight stirring of the electrodeposition liquid bath was useful for improving the optical image density and uniformity of and image.

Example 9

The same electrodeposition liquid as in Example 2 was completed in the same manner as in Example 2.

Then the same apparatus as in Example 2 as shown in FIG. 9 was used, and an image signal was inputted into an optical image inputting section on the rear surface of the image supporting member by a He—Ne laser ray 23, while a pulse DC pulse voltage of 2.5 V (pulse widthe 2 ms/pulse cycle 3 ms) was applied between the working electrode and the counter electrode by means of the potentiostat power source 4. In this example, a temperature control apparatus was inserted into the electrodeposition bath and the image formation was conducted at constant temperature (40° C.) with conducting temperature control.

Then the image supporting member which had completed this image formation was taken out, and it was confirmed that an image having an optical image density of 1.49 was formed on the surface of the image supporting member and the optical density distribution 5 at solid part was 0.05. On the other hand, regarding the image formed in Example 2, it was confirmed that an image having an optical image density of 1.48 was formed on the surface of the image supporting member and the optical density distribution δ at solid part was 0.09 in the same evaluations. Therefore, it was found that control of the liquid temperature of the coloring material liquid in the coloring material electrodeposition liquid bath at constant temperature was useful for improving the optical image density and uniformity of and image.

Example 10

According to the same manner as in Example 3, an electrodeposition liquid was prepared, the image forming process was conducted, the image supporting member on which an image had been formed was taken out from the electrodeposition bath, and plain paper was placed on the surface of the image supporting member on which an image containing the coloring material particle had been formed.

A conductive rubber roller and insulated rubber roller were used, and the plain paper and the image supporting member were sandwiched there between at a linear load of 300 g/cm by applying pressure and bias voltage of +600 V was applied to the conductive rubber roller. The paper and the image supporting member were conveyed by the rotation of the rollers. Directly after conveyed out from the rollers, the plain paper was peeled from the image supporting member, and a transferred image having an optical image density of 1.38 was formed on the plain paper.

Then, the remaining image forming material after the transfer on the surface of the image supporting member was removed by using a rubber blade. By this, the surface of the image supporting member returned to the initial condition, and preparation for the next image formation was accomplished. The critical surface tension on the surface of the image supporting member was 35 dyne/cm.

Example 11

The image forming process was conducted in a similar manner as in Example 3 except that an electrodeposition liquid was prepared according to the same manner as in Example 3, but an image supporting member having a critical surface tension of 44 dyne/cm was used, and the image supporting member on which surface an image had been formed was taken out from the electrodeposition bath, and plain paper was placed on the surface of the image supporting member on which an image containing the coloring material particle had been formed.

A conductive rubber roller and insulated rubber roller were used, and the plain paper and the image supporting member were sandwiched there between at a linear load of 300 g/cm by applying pressure and bias voltage of +500 V was applied to the conductive rubber roller. The plain paper and the image supporting member were conveyed by the rotation of the rollers. Directly after conveyed out from the rollers, the plain paper was peeled from the image supporting member, and a transferred image having an optical image density of 1.18 was formed on the plain paper.

Then, the remaining image forming material after the transfer on the surface of the image supporting member was removed by using a rubber blade. However, the image forming material partially remained in the form of a film, and the surface of the image supporting member did not return to the initial condition. By this, it was found that when the critical surface tension on the surface of the image supporting member is too high, the surface of the image supporting member does not easily return to the initial condition, therefore, it is not suitable for re-use.

Example 12

The image forming process was conducted in a similar manner as in Example 2 except that an electrodeposition liquid was prepared according to the same manner as in Example 2, but an image supporting member having a critical surface tension of 18 dyne/cm was used, and the image supporting member was taken out from the electrodeposition bath, a coloring material image was formed on the image supporting member and plain paper was placed on the surface of the image supporting member. A conductive rubber roller and insulated rubber roller were used, and the plain paper and the image supporting member were sandwiched between the rollers at a linear load of 300 g/cm by applying pressure and bias voltage of +600 V was applied to the conductive rubber roller. The paper and the image supporting member were conveyed by the rotation of the rollers. Directly after conveyed out from the rollers, the plain paper was peeled from the image supporting member, and a transferred image having an optical image density of 0.88 on solid part was formed on the plain paper. However, the line image generated flow and exhibit reproduction deficiency. By this, it was found that when the critical surface tension on the surface of the plain member of the image supporting member is too low, the maintaining ability of the image formed on the surface of the image supporting member deteriorates.

Then, the remaining image forming material after the transfer on the surface of the image supporting member was removed by using a rubber blade. By this, the surface of the image supporting member returned to the initial condition, and preparation for the next image formation was accomplished.

Example 13

160 parts by weight of 20% by weight aqueous alkali solution of a styrene-methacrylic acid copolymer (molecular weight: 16,000, hydrophobic group/(hydrophilic group+ hydrophobic group) molar ratio: 69%, acid value: 160), 5 parts by weight of carbon black powder (having an average particle diameter of 0.1 $\mu$m), 15 parts by weight of diethylene glycol, 7 parts by weight of isopropanol, and 55 parts by weight of distilled water were mixed, and moderately stirred for 1 hour by means of a propeller to sufficiently wet the carbon black powder with the liquid and thus to prepare a dispersion containing roughly dispersed carbon black powder. This dispersion was then subjected to an intensive, forced-dispersing treatment using a homogenizer for 3 minutes to prepare a base dispersion. Into this base dispersion was dropwisely added a dilute solution containing 120 parts by weight of distilled water, 10 parts by weight of glycerin, and 0.3 parts by weight of an anti-mold agent ((Proxycel XL-2 manufactured by ICI Inc.) while the liquid was stirred with a propeller. In this way, an electrodeposition liquid was prepared. The pH of this liquid was set to 4.6, 6.0, 7.5 and 9.5, respectively, by adjusting pH using an aqueous solution of hydrochloric acid and an aqueous solution of sodium hydroxide. The pH at which the fine particles of the coloring material started deposition from the liquid was 5.0. The pH at which precipitation leaving a complete supernatant occurred was 4.4.

Then, as illustrated in FIG. 4, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 4 mm thick blue glass plate substrate having a transparent electrically conductive layer of ITO formed thereon, and the transparent electrically conductive layer was covered with two organic photoconductive layers. The electrically conductive layer of ITO functioned as a working electrode and the surface of the organic photoconductive layer was smooth. The respective electrodes were connected to a potentiostat power source. An image signal was inputted into an optical image inputting section on the rear surface of the image supporting member while a DC voltage of 2.6 V was applied between the working electrode and the counter electrode for 7 seconds by means of the potentiostat power source.

Next, the image supporting member which had completed this image formation procedure was withdrawn from the liquid, and it was confirmed that high quality images having an optical image density of 1.35 (electrodeposition liquid of pH 4.6), 1.43 (electrodeposition liquid of pH 6.0), 1.39 (electrodeposition liquid of pH 7.5) and 1.05 (electrodeposition liquid of pH 9.5). In the electrodeposition liquid of pH 4.6, the coloring particle was precipitated at the bottom of the bath, and dispersion condition was instable.

As described above, according to the image recording method of the present invention, image formation is carried out by deposition phenomenon of an electrodeposition material containing a coloring particle onto an image supporting member which can allow current corresponding to an image signal through an electrodeposition liquid containing the above-described electrodeposition material, and image formation can be effected at given position by application of voltage and irradiation with a laser ray. Therefore, according to the present invention, recording can be conducted with excellent resolution, as well as, recording can be achieved having printing properties such as high optical density, high resolution, image structure having small image thickness, strong adhesion of an image, excellent halftone reproduction, high fastness of an image, high safety and the like.

As described above, according to the inventions described in Examples 1 to 13, an image having a high optical density, high resolution, structure of small thickness, high fastness and high safety can be achieved by conducting image formation by electrodeposition phenomenon using an image supporting member wherein the proportion of the number of hydrophobic groups in the monomer unit of an electrodeposition material to the total number of hydrophilic groups and hydrophobic groups is in the range from 40% to 80%, the average molecular weight of the electrodeposition material is in the range from 4,000 to 30,000, the acid value is in the range from 60 to 300, and pH range in which a precipitation is formed from dissolved condition in the change in pH of an electrodeposition liquid is preferably 1 or less, and current is allowed to flow corresponding to an image signal.

Example 14

10 parts by weight of carbon black powder (having an average particle diameter of 0.1 μm), 15 parts by weight of diethylene glycol, 3 parts by weight of polyoxyethylene alkylether carboxylate, 3 parts by weight of polyethylene glycol dicarboxylate, 6 parts by weight of a water-soluble acrylic resin, 7 parts by weight of isopropanol, 2.0 parts by weight of 20% by weight ammonia water, and 55 parts by weight of distilled water were mixed, and moderately stirred for 1 hour by means of a propeller to sufficiently wet the carbon black powder with the liquid and thus to prepare a dispersion containing roughly dispersed carbon black powder. This dispersion was then subjected to an intensive, forced-dispersing treatment using a homogenizer for 3 minutes to prepare a base dispersion. Into this base dispersion was dropwisely added a dilute solution containing 120 parts by weight of distilled water, 10 parts by weight of glycerin, and 0.8 parts by weight of an anti-mold agent ((Proxycel XL-2 manufactured by ICI Inc.) while the liquid was stirred with a propeller. In this way, a dispersion containing fine particles of a coloring material for use in electrodeposition was prepared. The pH of this liquid was set to 7.5 by adjusting pH using an aqueous solution of acetic acid (boiling point: 118° C.) and an aqueous solution of ammonia (boiling point: −33.4° C.).

The pH at which the fine particles of the coloring material started deposition from the liquid was 6.0. The resistivity of the liquid was $7 \times 10^2$ Ω·cm.

In the image recording apparatus as illustrated in FIG. 4, this aqueous coloring material liquid was used to record an image. As shown in FIG. 4, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 4 mm thick glass plate substrate having a transparent electrically conductive layer of ITO formed thereon, and the transparent electrically conductive layer was covered with two organic photoconductive layers (Perylene-phthalocyanine-based organic photoconductive layer). The electrically conductive layer of ITO functioned as a working electrode and the surface of the organic photoconductive layer was smooth without unevenness. The respective electrodes were connected to a potentiostat power source. An image signal was inputted into an optical image inputting section on the rear surface of the image supporting member, while a DC voltage of 2.8 V was applied between the working electrode and the counter electrode for 17 seconds by means of the potentiostat power source.

Next, the image supporting member which had completed this image formation was withdrawn from the liquid, and the liquid component and ammonia component were removed from the deposited image by using a dryer at 130° C. for 30 seconds, and it was confirmed that an image having an optical image density of 1.31 was formed on the surface of the image supporting member. The surface of this image was washed with distilled water for 30 seconds. As a result, the optical image density of 1.31 remained and high fastness was confirmed.

Example 15

20 parts by weight of carbon black powder (having an average particle diameter of 0.05 μm), 10 parts by weight of polyethylene glycol, 6 parts by weight of polymethyl acrylate dicarboxylate, 6 parts by weight of polyoxyethylene alkylphenylcarboxylate, 6 parts by weight of a water-soluble acrylic resin, 10 parts by weight of isopropanol, 6 parts by weight of an aqueous ammonia solution, and 50 parts by weight of distilled water were mixed, and moderately stirred for 3 hours by means of a propeller to sufficiently wet the carbon black powder with the liquid and thus to prepare a dispersion containing roughly dispersed carbon black powder. This dispersion was then subjected to a dispersing treatment using a ball mill for 24 hours to prepare a base dispersion. Into this base dispersion was dropwisely added a diluent containing 200 parts by weight of distilled water, 20 parts by weight of glycerin and 0.5 parts by weight of an anti-mold agent ((Proxycel XL-2 manufactured by ICI Inc.) while the liquid was stirred with a propeller. In this way, a dispersion containing fine particles of a coloring material for use in electrodeposition was prepared. The pH of this liquid was set to 7.0 by adjusting pH by an aqueous solution of hydrochloric acid (boiling point: −85° C.) and an aqueous solution of ammonia (boiling point: −33.4° C.)

The pH at which the fine particles of the coloring material started deposition from the liquid was 5.5. The resistivity of the liquid was $5\times10^2$ Ω·cm.

Using an image recording apparatus as illustrated in FIG. 9, in a bath 2 filled with the electrodeposition liquid was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multilayered structure comprising a 2 mm thick quartz substrate having a transparent electrically conductive layer of ITO formed thereon, and the transparent electrically conductive layer was covered with two organic photoconductive layers fromby a similar manner as in Example 14. The electrically conductive layer of ITO functioned as a working electrode and the surface of the organic photoconductive layer was smooth. The respective electrodes were connected to a potentiostat power source. An image signal was inputted into an optical image inputting section on the rear surface of the image supporting member by a He—Ne laser ray 23 emitted from a laser source 24, while a DC pulse voltage of 4.0 V (having a pulse width of 2 ms/pulse cycle of 3 ms) was applied between the working electrode and the counter electrode by means of the potentiostat power source 4.

Next, the image supporting member which had completed this image formation was withdrawn from the liquid, smooth plain paper was placed on the surface of the image supporting member, and passed through a pair of aluminum rolls coated with silicone rubber under pressed condition at the surface temperature thereof of 150° C., and an image is heated and transferred to this plain paper and simultaneously the ammonia component was removed by this heating. It was confirmed that a high quality image having an optical image density of 1.28 was formed on the surface of the image supporting member. For testing water-resistance of this image recorded paper, it was immersed in pure water at 40° C. for 60 seconds and change between before and after the immersion was evaluated. As a result, it was found that the change in the optical image density was 0.1 or less, and the recorded paper had high water-resistance and fastness.

Example 16

10 parts by weight of phthalocyanine powder (having an average particle diameter of 0.05 μm), 10 parts by weight of ethyl cellosolve, 7 parts by weight of polyoxyethylene alkylphenylacetate, 4 parts by weight of polymethyl acrylate dicarboxylate, 6 parts by weight of a water-soluble acrylic resin, 10 parts by weight of isopropanol, 4 parts by weight of dimethtylaminoethanol and 50 parts by weight of distilled water were mixed, and moderately stirred for 0.5 hours by means of a propeller to sufficiently wet the pigment powder with the liquid and thus to prepare a dispersion containing roughly dispersed pigment powder. This dispersion was then subjected to a dispersing treatment using a homogenizer for 6 minutes to prepare a base dispersion. Into this base dispersion was dropwisely added a dilute solution containing 170 parts by weight of distilled water, 30 parts by weight of diethylene glycol and 0.5 parts by weight of an anti-mold agent ((Proxycel XL-2 manufacturedby ICI Inc.) while the liquid was stirred with a propeller. In this way, a dispersion containing fine particles of a coloring material for use in electrodeposition was prepared. The pH of this liquid was set to 7.6 by adjusting the pH using an aqueous solution of hydrochloric acid (boiling point: −85° C.) and an aqueous solution of dimethylaminoethanol (boiling point: 135° C.). The pH at which the fine particles of the coloring material starting deposition from the liquid was 6.0. The volume resistivity of the liquid was $5\times10^2$ Ω·cm.

Using the image recording apparatus as illustrated in FIG. 10, in a bath 2 filled with the electrodeposition liquid was disposed an image supporting member 3 to which an image signal could be inputted, in such a manner that the rear surface was exposed to the outside of the bath. The image supporting member 3 gave a conductive layer of 5 mm thick in which current scattering had been suppressed and the surface in contact with the liquid of the conductive layer was smooth. The respective electrodes were connected to a potentiostat power source. An image signal was inputted into an image inputting section on the rear surface of the image supporting member using a needle electrode image inputting printing head 12 of 600 DPI, while a DC pulse voltage of 10.0 V (pulse width 2 ms/pulse cycle 3 ms) was applied between the needle electrode and the counter electrode in synchronization with the scanning speed of the printing head 28.

Next, the image supporting member which had completed this image formation was withdrawn from the liquid and dried with hot air at 100° C. for 30 seconds, and it was confirmed that a cyan-colored high quality image having an optical image density of 1.43 was formed on the surface of the image supporting member. Further, printing was conducted, while a DC pulse voltage of 6.5 V was applied between the needle electrode and the counter electrode and hot air drying was conducted in the same manner, and it was confirmed that a cyan-colored high quality image having an optical image density of 1.10 was formed on the surface of the image supporting member.

By this, it was found that the optical image density of the resulting image can be controlled by controlling the voltage applied.

Example 17

20 parts by weight of carbon black powder (having an average particle diameter of 0.02 μm), 10 parts by weight of polyethylene glycol, 5 parts by weight of polymethyl acrylate dicarboxylic acid, 5 parts by weight of polyoxyethylenealkylphenyl carboxylic acid, 6 parts by weight of a water-soluble acrylic resin, 10 parts by weight of isopropanol, 3 parts by weight of methylaminoethanol, and 50 parts by weight of distilled water were mixed, and moderately stirred for 3 hours by means of a propeller to sufficiently wet the carbon black powder with the liquid and thus to prepare a dispersion containing roughly dispersed carbon black powder. This dispersion was then subjected to a dispersing treatment using a ball mill for 24 hours to prepare a base dispersion. Into this base dispersion was dropwise added a dilute solution containing 200 parts by weight of distilled water, 20 parts by weight of glycerin, 4 parts by weight of pyrrole and 0.5 parts by weight of an anti-mold agent ((Proxycel XL-2 manufactured by ICI Inc.) while the liquid was stirred with a propeller. In this way, a dispersion containing fine particles of a coloring material for use in electrodeposition was prepared. The pH of this liquid was set to 6.7 by adjusting pH using an aqueous solution of phosphoric acid and an aqueous solution of methylaminoethanol. The pH at which the fine particles of the coloring material started deposition from the liquid was 5.0. The pH at which precipitation leaving a clear supernatant occurred was 5.4. The resistivity of the liquid was $3\times10^2$ Ω·cm.

The same apparatus as in Example 15 as illustrated in FIG. 9 was used, and, in an electrodeposition bath 2 filled with the electrodeposition liquid 1 was disposed an image supporting member 3, whose rear surface was fitted with a working electrode so that an image signal could be inputted, in such a manner that the rear surface was exposed to the outside of the bath. Further, in the bath 2 were disposed a counter electrode 5 and a controlling electrode 6 utilizing a salt bridge. The image supporting member 3 had a multi-layered structure comprising a 2 mm thick plate quartz substrate having a transparent electrically conductive layer of ITO formed thereon, and the transparent electrically conductive layer was covered with two organic photoconductive layers. The electrically conductive layer of ITO functioned as a working electrode and the surface of the organic photoconductive layer was smooth. The respective electrodes were connected to a potentiostat power source. An image signal was inputted into an optical image inputting section on the rear surface of the image supporting member by a He—Ne laser ray, while a DC pulse voltage of 3.0 V was applied between the working electrode and the counter electrode by means of the potentiostat power source 4.

Next, the image supporting member which had completed this image formation was withdrawn from the liquid, smooth plain paper was placed on the surface having the image of the image supporting member and transfer by applying pressure was conducted onto the plain paper and the transferred image was passed through a pair of aluminum rolls coated with silicone rubber under a linear pressure of 300 g/cm at the surface temperature thereof of 160° C., and removal of the amine component and fixation of the image on this plain paper was conducted. It was confirmed that a high quality image having an optical image density of 1.26 was formed on the surface of the plain paper. This image was immersed in water in a water tank to which ultrasonic vibration was applied for 30 seconds. As a result, it was found that the change in the image density was 0.1 or less, and the recorded paper had high water-resistance and fastness.

As described above, according to the inventions described in Examples 14 to 17, an image having high optical density, high resolution, structure of small thickness, excellent halftone reproduction, high fastness and high safety can be obtained by conducting image formation by electrodeposition phenomenon on an image supporting member wherein current is allowed to flow corresponding to an image signal, using an aqueous electrodeposition material dispersion containing a pH regulator having a boiling point of 150° C. or less, and by removing, in the subsequent image heating process, only the pH regulator, or particularly, a pH regulator which promotes deterioration and dissolution of the image.

What is claimed is:

1. An image forming method, comprising:
    preparing an aqueous dispersion containing an electrodeposition material including:
        a coloring material; and
        a polymer which is chemically dissolved, or deposited and precipitated, by a change in pH, in a liquid in vessel;
        wherein the vessel having therein:
            an image supporting member including at least:
                an electrode, which can supply current or an electric field in accordance with an image pattern, and a surface which can support an image; and
                a counter electrode which forms a pair of electrodes together with the electrode;
    depositing and precipitating the electrodeposition material including the coloring material and polymer to form an image by supplying current or an electric field in accordance with an image pattern to the image supporting member and the counter electrode and by changing the pH value of the aqueous dispersion in the vicinity of the image supporting surface of the image supporting member;
    wherein the aqueous dispersion contains at least one pH regulator having a boiling point of 150° C. or less.

2. An image forming method according to claim 1 further comprising:
    heating the electrodeposition material which has been deposited and precipitated in an image pattern on the image supporting surface of the image supporting member.

3. An image forming method according to claim 1 further comprising:
    transferring, onto a recording medium by heating, the electrodeposition material which has been deposited and precipitated in an image pattern on the image supporting of the image supporting surface member.

4. An image forming method according to claim 1 further comprising:
    transferring, onto a recording medium, the electrodeposition material which has been deposited and precipitated in an image pattern on the image supporting surface of the image supporting member; and
    fixing the transferred image by heating.

5. An image forming method according to claim 1, wherein the current or electric field is supplied to the image supporting member and counter electrode, by a current generating means for generating current on the image supporting surface of the image supporting member in accordance with a photoimage signal, said current generating means including mechanism for converting an inputted photoimage signal into current.

6. An image forming method according to claim 1, wherein:
    (i) when the electrodeposition material is deposited on an anode during electrodeposition, the pH value of said aqueous dispersion is set within the range from a pH value, which equals a start pH value at which electrodeposition of the electrodeposition material starts minus the number 1, to a pH value which equals the start pH value plus the number 3, and
    (ii) when the electrodeposition material is deposited on a cathode during electrodeposition, the pH value of said aqueous dispersion is set within the range from a pH value which equals the start pH value minus the number 3, to a pH value which equals the start pH value plus the number 1.

7. An image forming method according to claim 1, wherein the aqueous dispersion contains a water-soluble solvent having a boiling point of 150° C. or more and a vapor pressure in atmosphere of 50 mmHg or less.

8. An image forming method according to claim 1, wherein the at least one pH regulator is/are selected from the group consisting of ammonia, methylaminoethanol, dimethylaminoethanol, ethylaminoethanol, ethylenediamine, propylenediamine, methylamine, dimethylamine, trimethylamine, monoethylamine, diethylamine, triethylamine, propylamine, dipropylamine, butylamine, pentylamine, hydrogen chloride, acetic acid and hydrochloric acid.

9. An image forming method according to claim 1, wherein the at least one pH regulator is/are selected from the group consisting of ammonia, methylaminoethanol, dimethylaminoethanol, ethylaminoethanol, ethylenediamine, propylenediamine, methylamine, dimethylamine, trimethylamine, monoethylamine, diethylamine, triethylamine, propylamine, dipropylamine, butylamine, pentylamine, hydrogen chloride and hydrochloric acid.

10. A method for forming a colored film on a substrate, comprising:

preparing an electrolytic solution comprising water, a colorant, and a water soluble polymer which allows the colorant to disperse in the water, the polymer having a solubility in water which changes due to a change in a pH value of the electrolytic solution;

setting a substrate, which has an electrode on the substrate, in contact with the electrolytic solution;

applying a voltage between the electrode and a counter electrode via the electrolytic solution, so as to change a pH value of the solution in the vicinity of the electrode; and depositing the polymer and the colorant on the electrode due to a change in the solubility of the polymer.

11. The method as set forth in claim 10, wherein the polymer exhibits a hysteresis characteristic in the solution.

12. The method as set forth in claim 11, wherein the hysteresis characteristic of the polymer changes in accordance with the pH value of the solution.

13. The method as set forth in claim 10, wherein the polymer includes both a hydrophilic group and a hydrophobic group, and the change in the solubility of the polymer is due to a reversible change of the hydrophilic group to a hydrophobic group.

14. The method as set forth in claim 13, wherein the hydrophilic group is an ionized carboxylic group or an amino group.

15. The method as set forth in claim 10, wherein the polymer includes at least one hydrophobic monomer unit selected from the group consisting of styrene, α-methylstyrene, methylmethacrylate, butylmethacrylate, acrylonitrile, vinylacetate, ethylacrylate, butylacrylaie, laurylacrylate and derivatives thereof.

16. The method as set forth in claim 10, wherein the electrolytic solution further comprises a water soluble solvent which has a boiling point of more than 120° C. and a vapor pressure of not more than 50 mmHg.

17. The method as set forth in claim 10, wherein the colorant is a pigment having an average particle diameter from 0.02 $\mu$m to 0.3 $\mu$m.

18. The method as set forth in claim 10, wherein the electrolytic solution has a conductivity of not more than 10 $\Omega \cdot$cm.

19. The method as set forth in claim 10, wherein the change in the pH value of the electrolytic solution required to change the solubility of the polymer is a value less than or equal to 1.

20. The method as set forth in claim 10, wherein the voltage is applied between the electrode and the counter electrode such that bubbling on the substrate, which is caused by electrolysis of the water, is suppressed.

21. The method as set forth in claim 10, wherein the applied voltage is not more than about 5 volts.

22. The method as set forth in claim 10, wherein the substrate further has on the substrate a photoconductive layer which is adjacent to the electrode, and the voltage is applied by exposing the photoconductive layer to light.

23. The method as set forth in claim 22, wherein the applied voltage is a bias voltage or a voltage obtained by photoelectric conversion.

24. The method as set forth in claim 23, wherein the substrate is a transparent substrate, and the transparent substrate is exposed to light irradiated from a side of the transparent substrate opposite a side at which the electrode is provided.

* * * * *